US008429558B2

(12) United States Patent
LeMay et al.

(10) Patent No.: US 8,429,558 B2
(45) Date of Patent: *Apr. 23, 2013

(54) DISPLAYING CONTENT FOR VARIOUS ASPECT RATIOS

(75) Inventors: Steven G. LeMay, Reno, NV (US); Robert E. Breckner, Reno, NV (US); David A. Gipp, Portland, OR (US); Gregory A. Schlottmann, Sparks, NV (US)

(73) Assignee: IGT, Reno, NV (US)

( * ) Notice: Subject to any disclaimer, the term of this patent is extended or adjusted under 35 U.S.C. 154(b) by 209 days.

This patent is subject to a terminal disclaimer.

(21) Appl. No.: 12/725,416

(22) Filed: Mar. 16, 2010

(65) Prior Publication Data

US 2010/0227692 A1 Sep. 9, 2010

Related U.S. Application Data

(63) Continuation of application No. 11/558,604, filed on Nov. 10, 2006, now Pat. No. 7,712,045.

(51) Int. Cl.
*G06F 3/048* (2006.01)

(52) U.S. Cl.
USPC ............ 715/788; 715/798; 715/800; 715/801

(58) Field of Classification Search .................. 715/722, 715/762, 765, 788, 789, 800, 801
See application file for complete search history.

(56) References Cited

U.S. PATENT DOCUMENTS

| | | | | |
|---|---|---|---|---|
| 5,513,342 | A * | 4/1996 | Leong et al. | .................. 715/798 |
| 6,264,561 | B1 | 7/2001 | Saffari et al. | |
| 6,278,433 | B2 | 8/2001 | Narui | |
| 6,645,077 | B2 | 11/2003 | Rowe | |
| 7,712,045 | B2 | 5/2010 | LeMay et al. | |
| 2003/0038832 | A1 * | 2/2003 | Sobol | ............................ 345/722 |
| 2003/0203756 | A1 | 10/2003 | Jackson | |

(Continued)

FOREIGN PATENT DOCUMENTS

EP 1 217 600 A1 6/2002

OTHER PUBLICATIONS

Australian Examiner's Third Report dated Sep. 25, 2012 issued in AU 2007319464 [P255AU].

(Continued)

*Primary Examiner* — Weilun Lo
*Assistant Examiner* — Truc Chuong
(74) *Attorney, Agent, or Firm* — Foley & Lardner LLP

(57) ABSTRACT

A resource manager can vary content for various display aspect ratios used to display information in a computing environment. This allows providing content that is more suitable and/or especially designed for display on a particular aspect ratio. It will be appreciated that resource manager can facilitate execution of the same computer program code for various aspect ratio as content displayed can be effectively adjusted by the resource manager. In order to support multiple aspect ratios, the resource manager can use an Aspect Ratio Adaptable Data Set (ARADS) that effectively supports displaying graphical content for various aspect ratios. The (ARADS) can include "base data" and "aspect-ratio-specific data" that can complement and/or replace the base data. The base data can be used as an initial basis for displaying graphics on any one of a plurality of different aspect ratios while the aspect-ratio-specific data can be specifically designed for and/or accommodate a particular aspect ratio.

23 Claims, 11 Drawing Sheets

U.S. PATENT DOCUMENTS

| | | | | |
|---|---|---|---|---|
| 2004/0102245 | A1 | 5/2004 | Escalera et al. | |
| 2004/0107245 | A1 | 6/2004 | Bodnar | |
| 2004/0248642 | A1 | 12/2004 | Rothschild | |
| 2005/0059494 | A1 | 3/2005 | Kammler | |
| 2006/0009286 | A1 | 1/2006 | Durham et al. | |
| 2006/0140513 | A1 | 6/2006 | Tran Xuan et al. | |
| 2008/0072252 | A1 | 3/2008 | Morris et al. | |
| 2008/0111841 | A1 | 5/2008 | LeMay et al. | |
| 2008/0171602 | A1* | 7/2008 | Patel et al. | 463/42 |

OTHER PUBLICATIONS

U.S. Office Action dated May 14, 2009 issued in U.S. Appl. No. 11/558,604 [P255].

U.S. Notice of Allowance dated Dec. 16, 2009 issued in U.S. Appl. No. 11/558,604 [P255].

Australian Examiner's First Report dated Sep. 26, 2011 issued in AU 2007319464 [P255AU].

European First Examination Report dated Jan. 27, 2010 issued in EP 07844988.1 [P255EP].

European Summons to Attend Oral Proceedings dated Mar. 21, 2011 issued in EP 07844988.1 [P255EP].

European Second Examination Report dated Oct. 4, 2011 issued in EP 07844988.1 [P255EP].

PCT International Search Report & Written Opinion dated May 7, 2008 issued in WO 2008/060956 [P255WO].

"Aspect ratio (image)," From Wikipedia, the free encyclopedia, http://en.wikipedia.org/wiki/Aspect_ratio, Jul. 24, 2012.

"Image resolution," From Wikipedia, the free encyclopedia, http://en.wikipedia.org/wiki/Image_resolution, Jul. 24, 2012.

"Pixel," From Wikipedia, the free encyclopedia, http://en.wikipedia.org/wiki/Pixel, Jul. 24, 2012.

* cited by examiner

Original Cleo content as seen on gaming machine
5:4 Aspect Ratio, 1280 x 1024 actual Widescreen adjusted content, with game elements re-positioned
to take advantage of widescreen aspect ratio

DISPLAYING CONTENT FOR VARIOUS ASPECT RATIOS

The present application is a continuation of and claims priority to commonly assigned U.S. patent application Ser. No. 11/558,604 by LeMay et al. for "DISPLAYING CONTENT FOR VARIOUS ASPECT RATIOS", filed on Nov. 10, 2006, the entire disclosure of which is hereby incorporated by reference for all purposes.

BACKGROUND

A pixel (an abbreviation of pictures) can be considered as one of the many tiny dots that make up the representation of a picture in a computer's memory. However, each such information element is not really a dot, nor a square, but an abstract sample. With care, pixels in an image can be reproduced at any size without the appearance of visible dots or squares; but in many contexts, they are reproduced as dots or squares and can be visibly distinct when not fine enough. The intensity of each pixel is variable; in color systems, each pixel has typically three or four dimensions of variability such and red, green and blue, or cyan, magenta, yellow and black.

Pixels are generally thought of as the smallest complete sample of an image. The definition is highly context sensitive. For example, we can speak of pixels in a visible mage (e.g., a printed page) or pixels carried by one or more electronic signal(s), or represented by one or more digital value(s), or pixels on a display device, or pixels in a digital camera (photo sensor elements). This list is not exhaustive and depending on context there are several synonyms which are accurate in particular contexts, e.g. pel, sample, bytes, bits, dots, sports, superset, triad, stripe set, window, etc. We can also speak of pixels in the abstract, in particular when using pixels as a measure of resolution, e.g. 2400 pixels per inch or 640 pixels per line. "Dots" is often used to mean pixels, especially by computer sales and marketing people, and gives rise to the abbreviation DPI or dots per inch.

The more pixels used to represent an image, the closer the result can resemble the original. The number of pixels in an image is sometimes called the resolution, though resolution can also be defined more specifically. Pixels can be expressed as a single number, as in a "three-megapixel" digital camera, which has a nominal three million pixels, or as a pair of numbers, as in a "640 by 480 display", which has 640 pixels from side to side and 480 from top to bottom (as in a VGA display), and therefore has a total number of 640×480=307,200 pixels.

In computer programming, an image composed of pixels is known as a bitmapped image or a raster image. The word raster originates from analogue television technology. Bitmapped images are used to encode digital video and to produce some types of computer-generated art. Since the resolution of most computer displays can be adjusted from the computer's operating system, a display's pixel resolution may not be an absolute measurement.

Modern LCD computer displays are designed with a native resolution which can be considered as the perfect match between pixels and triads (CRT displays are use red-green-blue phosphor triads, but they are not coincident with image pixels, and cannot therefore be said to be equivalent to pixels).

Typically, the native resolution will produce the sharpest picture capable from the display. However since the user can adjust the resolution, the monitor must be capable of displaying other resolutions. However, the size of the pixels on LCD displays are effectively fixed. As such, non-native resolutions have to be supported by approximate resampling in the LCD screen, using interpolation algorithms. This often causes the screen to look jagged or blurry. For example, a display with a native resolution of 1280×1024 will look best set at 1280×1024 resolution, and may be unable to display in 1600×1200 at all due to the lack of physical triads.

The aspect ratio of an image ("aspect ratio") can be defined as its displayed width divided by its height (usually expressed as "x:y"). For instance, the aspect ratio of a traditional television screen is 4:3, or 1.33:1. High definition television uses an aspect of 16:9, or about 1.78:1. Aspect ratios of 2.39:1 (2.35:1 prior to SMPTE revision in 1970) or 1.85:1 are frequently used in cinematography, while the aspect ratio of a sync-sound 35 mm film frame is around 1.378:1 (also known as "Academy" ratio). Silent films which used the full frame were shot in 1.33:1.

Today, several different aspect ratios are used to display content (e.g., graphics). The aspect ratios may vary from display device to display device and from manufacturer to manufacturer and change as new devices come to market. Varying aspect ratios provide unique challenges in a highly regulated gaming environment. As such, techniques that can accommodate displaying content for various aspect ratios would be highly useful.

SUMMARY

Broadly speaking, the invention relates to techniques for displaying content for various display aspect ratios ("aspect ratios"). It will be appreciated that the techniques are especially well suited for displaying content that includes graphics (graphical content) for environments that require adherence to various graphical design, licensing and/or regulatory requirements (e.g., gaming environments).

In accordance with one aspect of the invention, a resource manager can vary display content for various aspect ratios used to display information in a computing environment. The resource manager can, for example, effectively control and adjust the content to be displayed on a display based on the particular aspect ratio of the display. This allows providing content that is more suitable and/or especially designed for displaying on a particular aspect ratio. It will be appreciated that resource manager can facilitate execution of the same computer program code for various aspect ratio as the content displayed for each aspect ratio can be effectively adjusted by the resource manager. This means that the same computer program code (e.g., computer game such as video poker game) can be provided regardless of the aspect ratio used, yet the content including video, audio and audio-visual content associated with the computer program can be varied based on the aspect ratio used to display information on one or more displays.

In order to support multiple aspect ratios, the resource manager can use an Aspect Ratio Adaptable Data Set (ARADS) provided in accordance with another aspect of the invention. The Aspect Ratio Adaptable Data Set (ARADS) effectively supports displaying graphical content for various aspect ratios. The Aspect Ratio Adaptable Data Set (ARADS) can include "base data" and "aspect-ratio-specific data." The base data is used as a base (or initial basis) for displaying content (e.g., graphics) on any one of a plurality of different aspect ratios. It will be appreciated that the base data can, for example, include graphics (e.g., graphical objects, elements, items, icons, individual screens, or components displayed) designed for a particular aspect ratio (e.g., an existing game design for a particular aspect ratio associated with a display of a gaming machine). However, base data can also be designed to be independent of any particular aspect ratios in accordance with another aspect of the invention. On the other hand, the aspect-ratio-specific data provided as another component of the Aspect Ratio Adaptable Data Set (ARADS) can be designed to complement and/or replace the base data in order to, for example, present the graphics for a criteria such as those noted above for gaming environment). It will be appreciated that the base data can effectively be data commonly used for various aspect ratios. As such, typically the Aspect Ratio Adaptable Data Set (ARADS) requires less space and/or production time than it would be required to separately provide data for each different aspect ratio. Furthermore, this approach allows modification or addition of individual objects (elements, items, icons) rather than modifying an entire screen as a whole. In one embodiment, aspect-ratio-specific data is determined when base data is deemed to be insufficient for displaying content on a particular aspect ratio. This determination can, for example, be made based on various criteria associated with design or layout of graphics (e.g., as required or preferred for games played on gaming machines in a gaming environment).

In accordance with another aspect of the invention, the Aspect Ratio Adaptable Data Set (ARADS) can be used to support dynamic display of content, based on the aspect ratio as detected for a display. In one embodiment, a resource manager can determine the aspect ratio of a display and provide content deemed appropriate for the aspect ratio at a given time. These dynamic display techniques will be especially appreciated for computing environments where several different aspect ratios associated with numerous combination of displays can be used by various devices at a given time to execute any one of several programs (e.g., games on gaming machines configured for various combinations of display with different aspect ratios). In one embodiment, the aspect ratio of a display is determined before a computer program (e.g., game) is executed on a computing device (e.g., gaming machine). Based on the determined aspect ratio, appropriate aspect-ratio-specific data is determined in order to complement and/or replace the base data provided for multiple aspect ratios. Hence, display of graphics can be tailored for each display based on the display aspect ratio. Moreover, there is no need to have several different computer programs (e.g., computer games) to accommodate different aspect ratios, as this approach allows one computer program to be used with an Aspect Ratio Adaptable Data Set (ARADS) in order to effectively present data for various aspect ratios, thereby avoiding the cost of production and maintenance of separate computer codes and/or data for each aspect ratio used.

In accordance with yet another aspect of the invention, aspect-specific-ratio is determined by modifying a "base presentation." More particularly, base data is initially used as a base presentation for a particular aspect ratio. Subsequently, the base presentation can be effectively changed and/or adjusted for the particular aspect ratio to achieve a desired or preferred presentation. In one embodiment, a graphics package is used to display a base presentation. The graphics package is then used to modify the base presentation, based on visual inspection, to achieve the desired or preferred presentation. Subsequently, the desired or preferred presentation can be stored and aspect-ratio-specific data can be generated to represent the desired or preferred modifications and/or changes to the base presentation.

The invention can be implemented in numerous ways, including a method, an apparatus, a computer readable medium, a computer system, or a signal embodied in a carrier wave. Several embodiments of the invention are discussed below.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

Screen shots 5A-5B depict graphics for a computer game adjusted for a widescreen aspect ratio in accordance with one embodiment of the invention.

Figure 6:
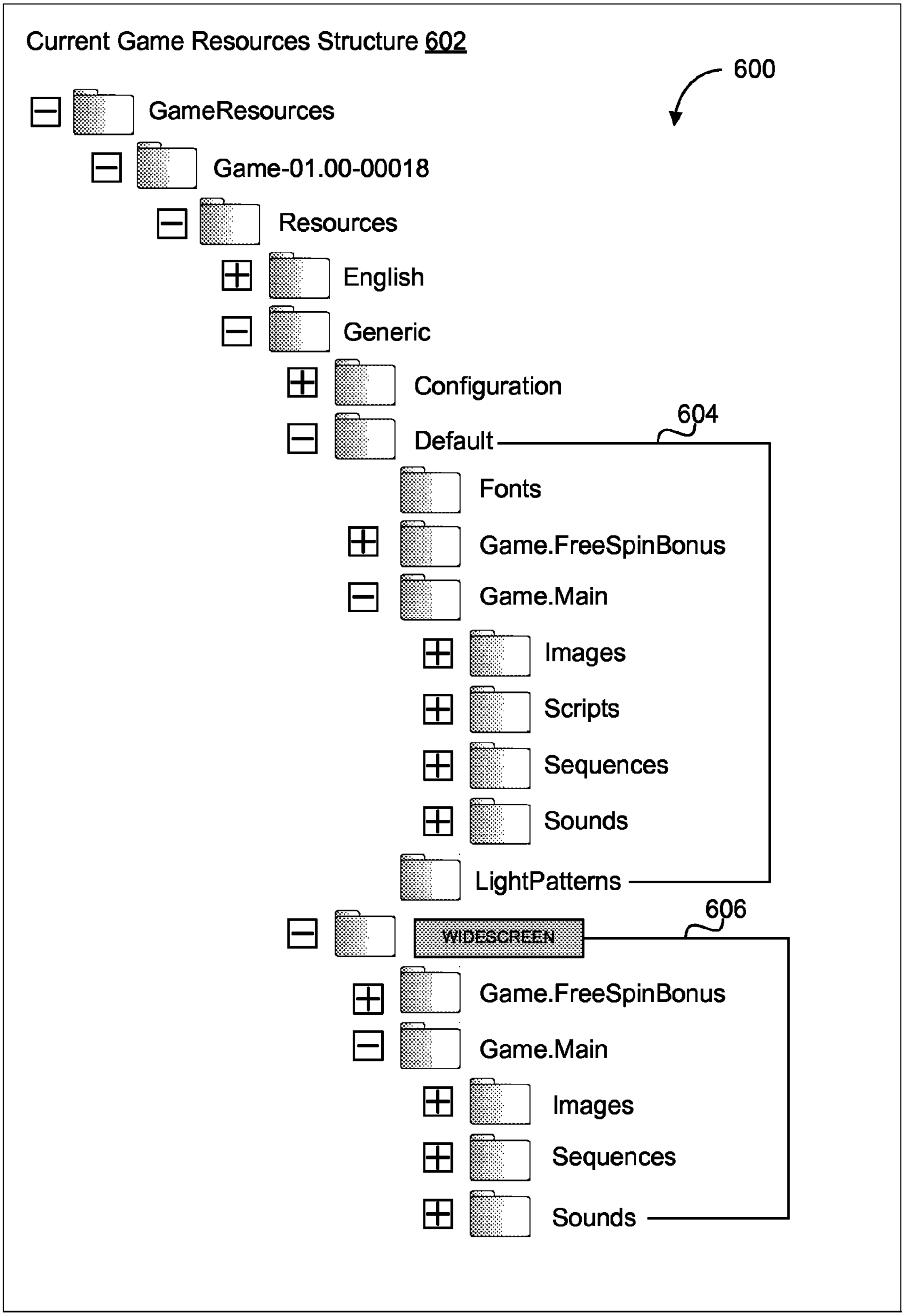

FIG. 6 depicts dual aspect ratio content provided for a Audio-Visual Processing or Presentation (AVP) system in accordance with one embodiment of the invention.

Figure 7:
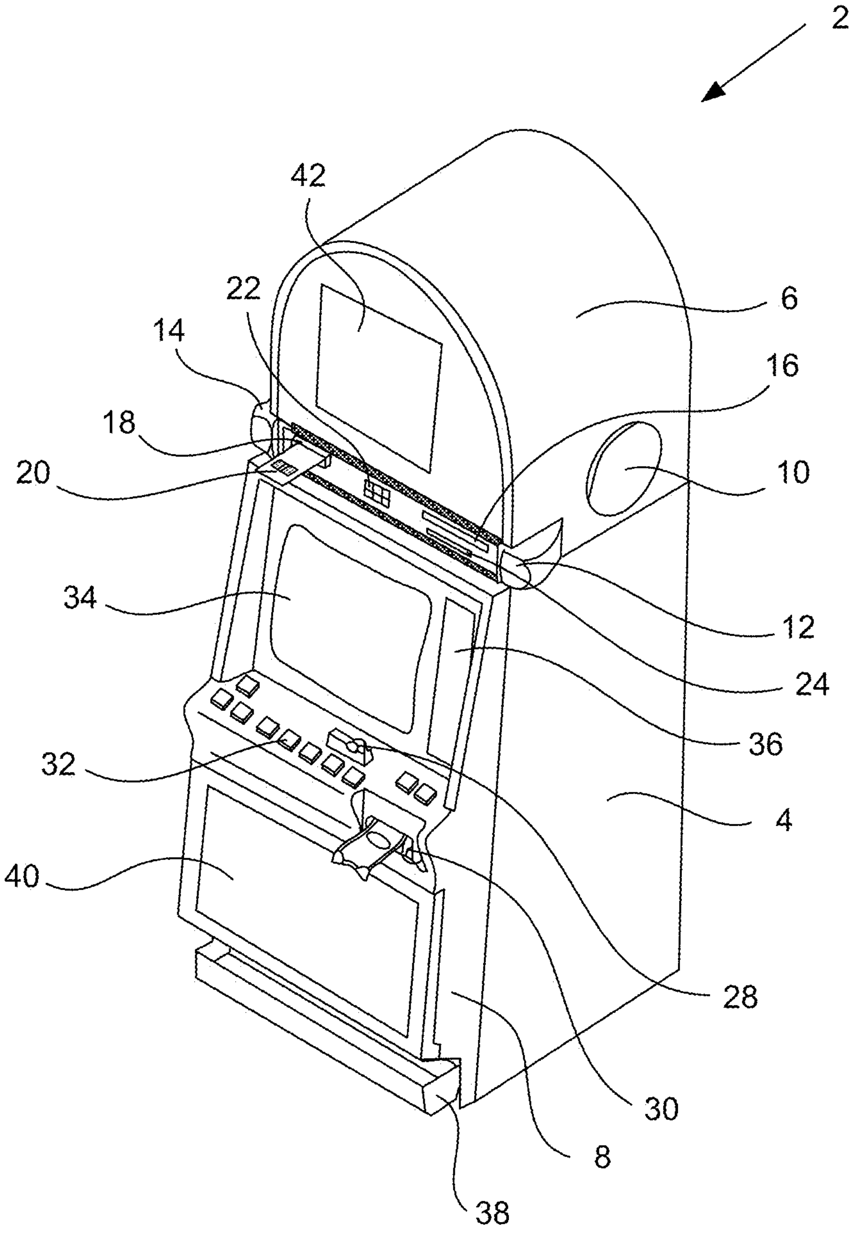

FIG. 7 depicts a video gaming-machine 2 that can be used in monitoring and controlling gaming-environment in accordance with one embodiment of the invention.

Figure 8:
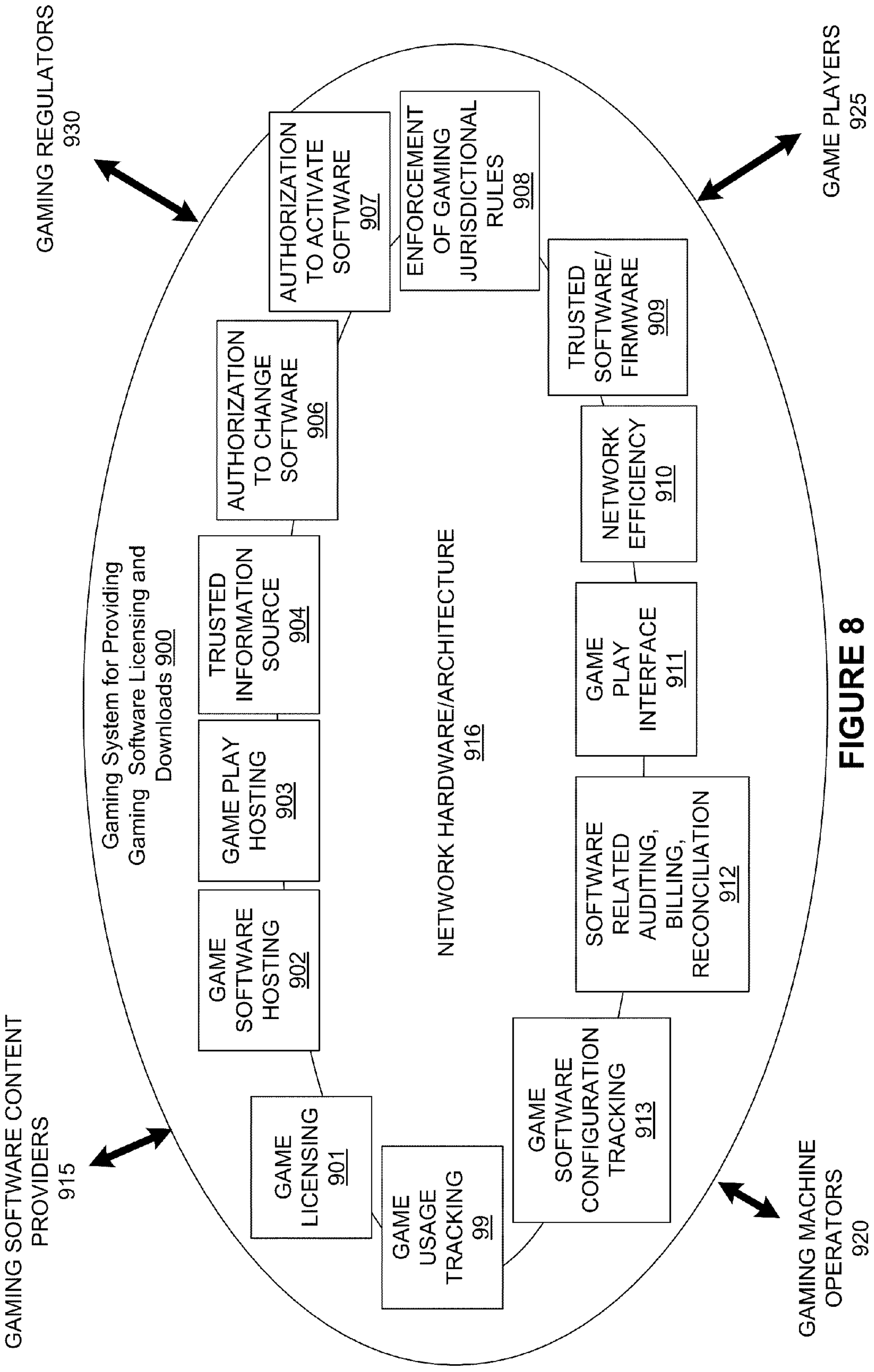

FIG. 8 shows a block diagram illustrating components of a gaming system which may be used for implementing various aspects of the present invention.

DETAILED DESCRIPTION

As noted in the background section, several different aspect ratios are in use today in gaming machines depending on the display technology employed. As such, techniques that can accommodate displaying content (e.g., graphics) for various aspect ratios would be highly useful. Unfortunately, accommodating different aspect ratios has been a difficult problem, especially for modern LCD screens partly because the size of the pixels are effectively fixed. As an example, content for Audio-Visual Processing or Presentation (AVP) is conventionally designed for a particular aspect ratio (e.g., standard screen). Displaying content designed of a specific aspect ratio (e.g., standard screen) on a different aspect ratio (e.g., widescreen) has proved to be problematic, especially for modern LCD screens partly because (unlike CRT's) the size of the pixels cannot be adjusted to accommodate an aspect ratio other than the one associated with the native resolution (or maximum resolution) of the LCD screen (or display). As a result, content originally designed for a particular aspect ratio (e.g., standard screen) is presented on another aspect ratio (e.g., widescreen) with undesirable effects of side effects. The undesirable side effects, for example, include losing the original look-and-feel, omission of content, and not maximizing use of available screen space.

Figure 1A:
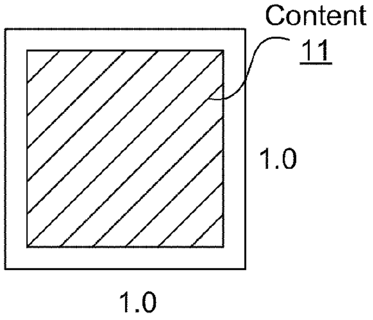
FIGS. 1A-1D illustrate problems with displaying content on different display aspect ratios.
Figure 1B:
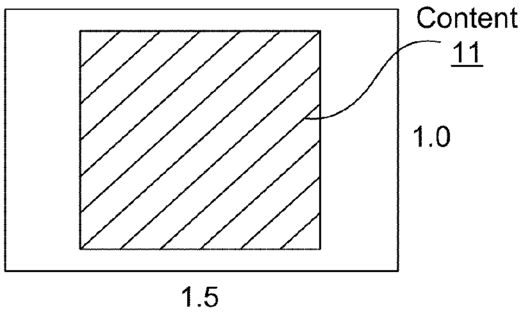
Figure 1C:
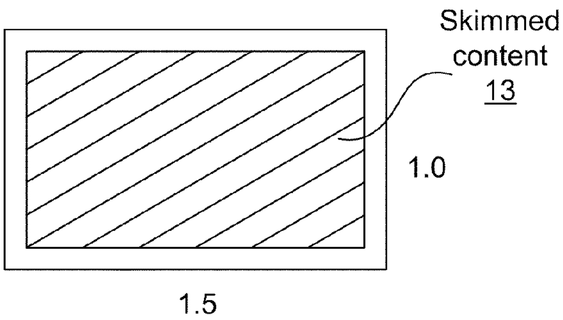
Figure 1D:
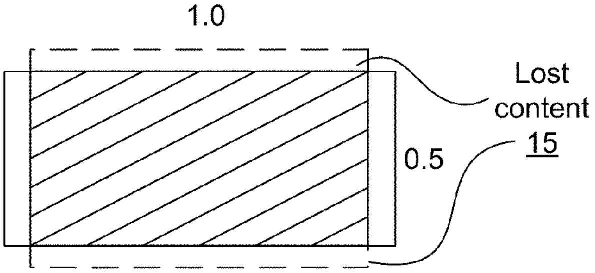

To further illustrate, FIG. 1A depicts contents originally designed for a hypothetical (800×800) screen (aspect ratio (1:1)). Referring to FIG. 1B, this original content can be displayed without distortion on a second screen (800×1200) screen (aspect ratio 1:1.5), but the area of the screen is not effectively utilized. Referring to FIG. 1C, if an attempt is made to use the area more effectively, the original image (or screen) represented a square is effectively stretched as represented by the rectangular shown in FIG. 1C. In other words, one or more graphical components, icons, items, elements, or objects may be distorted. In some cases, content may even by lost. Referring to FIG. 1D, a portion of the original content 11 is lost for a (1:2) aspect ratio.

These undesirable effects are especially problematic and/or unacceptable for applications (e.g., gaming) where it is highly desirable to maintain the same look and feel for the content (e.g., graphics displayed for a computer game) while maximizing the use of the screen and ensuring content especially what is considered to be critical (e.g., score, credit) is not lost and/or comprised (e.g., made less readable or clear as originally designed). In general, some environments (e.g., gaming environments) typically require a more sharper environment than that provided by TV or Personal Computer (PC) environments and have more rigorous standards with respect to, for example, how accurately information is presented and how easy it would be to read. For example, a gaming machine should display credit and other critical information accurately and in a manner that is easy to read. As such, even small variations from design, regulatory or licensing requirements, (e.g., Graphical User Interface design requirement) are generally unacceptable for some applications and environment (e.g., gaming applications and environment).

It should be noted that it is possible to create computer programs and/or data that specifically supports a particular aspect ratio. By way of example, a separate game can be designed for each different aspect ratio. Each game would have data and/or code designed for a particular aspect ratio. However, each game would be subject to often rigorous, costly and time consuming testing and approval as prescribed by various gaming jurisdictions. This approach is not desirable because it requires a significant amount of additional resources causing, among other things, a lag in production time.

Further, aspect ratios that are needed are not always known, a priori, to game manufacturers, which limits their ability to generate software that supports a particular aspect ratio. For example, a gaming machine may be manufactured with a display that provides a particular native aspect ratio. After some time in the field, the display may fail for some reason. At this time, as a result of the rapid evolution in display technologies, a new display with the same native aspect ratio may no longer be available and a new display with a different aspect ratio could be installed which may comprise the graphics quality of content displayed on the gaming machine. In this example, the gaming manufacturer has little ability to predict what display standards will exist when a replacement is needed. Hence, it would be a wasteful to generate code for a particular display standard.

In addition, original content which is relatively difficult and/or expensive to redo (e.g., movies) would have to be redone for several different aspect ratios. Yet another different drawback is that the size of programs (e.g., computer games) may dramatically increase (e.g., from 200 MB to 1.2 GB) in order to accommodate different aspect ratios. Furthermore, several sets of code would have to be maintained for each aspect ratio. If a different computer program is developed for each aspect ratio, then each computer program is tested separately. This, in turn, introduces a whole set of problems including testing, maintenance, licensing and regulatory issues (e.g., ensuring that each version of the game meets rigorous gaming and/or licensing requirements).

In view of the foregoing, it is apparent that there is a need for improved techniques for displaying content. Accordingly, the invention pertains to improved techniques for displaying content for various display aspect ratios ("aspect ratios"). It will be appreciated that the techniques are especially well suited for displaying content that includes graphics (graphical content) for environments that require adherence to various graphical design, licensing and/or regulatory requirements (e.g., gaming environments).

In accordance with one aspect of the invention, a resource manager can vary display content for various aspect ratios used to display information in a computing environment. The resource manager can, for example, effectively control and adjust the content to be displayed on a display based on the particular aspect ratio of the display. This allows providing content that is more suitable and/or especially designed for displaying on a particular aspect ratio. It will be appreciated that resource manager can facilitate execution of the same computer program code for various aspect ratio as the content displayed for each aspect ratio can be effectively adjusted by the resource manager. This means that the same computer program code (e.g., computer game such as video poker game) can be provided regardless of the aspect ratio used, yet the content including video, audio and audio-visual content associated with the computer program can be varied based on the aspect ratio used to display information on one or more displays.

In order to support multiple aspect ratios, the resource manager can use an Aspect Ratio Adaptable Data Set (ARADS) provided in accordance with another aspect of the invention. The Aspect Ratio Adaptable Data Set (ARADS) effectively supports displaying graphical content for various aspect ratios. The Aspect Ratio Adaptable Data Set (ARADS) can include "base data" and "aspect-ratio-specific data." The base data is used as a base (or initial basis) for displaying content (e.g., graphics) on any one of a plurality of different aspect ratios. It will be appreciated that the base data can, for example, include graphics (e.g., graphical objects, elements, items, icons, individual screens, or components displayed) designed for a particular aspect ratio (e.g., an existing game design for a particular aspect ratio associated with a display of a gaming machine). However, base data can also be designed to be independent of any particular aspect ratios in accordance with another aspect of the invention. On the other hand, the aspect-ratio-specific data provided as another component of the Aspect Ratio Adaptable Data Set (ARADS) can be designed to complement and/or replace the base data in order to, for example, present the graphics for a criteria such as those noted above for gaming environment). It will be appreciated that the base data can effectively be data commonly used for various aspect ratios. As such, typically the Aspect Ratio Adaptable Data Set (ARADS) requires less space and/or production time than it would be required to separately provide data for each different aspect ratio. Furthermore, this approach allows modification or addition of individual objects (elements, items, icons) rather than modifying an entire screen as a whole. In one embodiment, aspect-ratio-specific data is determined when base data is deemed to be insufficient for displaying content on a particular aspect ratio. This determination can, for example, be made based on various criteria associated with design or layout of graphics (e.g., as required or preferred for games played on gaming machines in a gaming environment).

In accordance with another aspect of the invention, the Aspect Ratio Adaptable Data Set (ARADS) can be used to support dynamic display of content, based on the aspect ratio as detected for a display. In one embodiment, a resource manager can determine the aspect ratio of a display and provide content deemed appropriate for the aspect ratio at a given time. These dynamic display techniques will be especially appreciated for computing environments where several different aspect ratios associated with numerous combination of displays can be used by various devices at a given time to execute any one of several programs (e.g., games on gaming machines configured for various combinations of display with different aspect ratios). In one embodiment, the aspect ratio of a display is determined before a computer program (e.g., game) is executed on a computing device (e.g., gaming machine). Based on the determined aspect ratio, appropriate aspect-ratio-specific data is determined in order to complement and/or replace the base data provided for multiple aspect ratios. Hence, display of graphics can be tailored for each display based on the display aspect ratio. Moreover, there is no need to have several different computer programs (e.g., computer games) to accommodate different aspect ratios, as this approach allows one computer program to be used with an Aspect Ratio Adaptable Data Set (ARADS) in order to effectively present data for various aspect ratios, thereby avoiding the cost of production and maintenance of separate computer codes and/or data for each aspect ratio used.

In accordance with yet another aspect of the invention, aspect-specific-ratio is determined by modifying a "base presentation." More particularly, base data is initially used as a base presentation for a particular aspect ratio. Subsequently, the base presentation can be effectively changed and/or adjusted for the particular aspect ratio to achieve a desired or preferred presentation. In one embodiment, a graphics package is used to display a base presentation. The graphics package is then used to modify the base presentation, based on visual inspection, to achieve the desired or preferred presentation. Subsequently, the desired or preferred presentation can be stored and aspect-ratio-specific data can be generated to represent the desired or preferred modifications and/or changes to the base presentation.

Embodiments of these aspects of the invention are discussed below with reference to FIGS. 1-8. However, those skilled in the art will readily appreciate that the detailed description given herein with respect to these figures is for explanatory purposes as the invention extends beyond these limited embodiments.

Figure 1E:
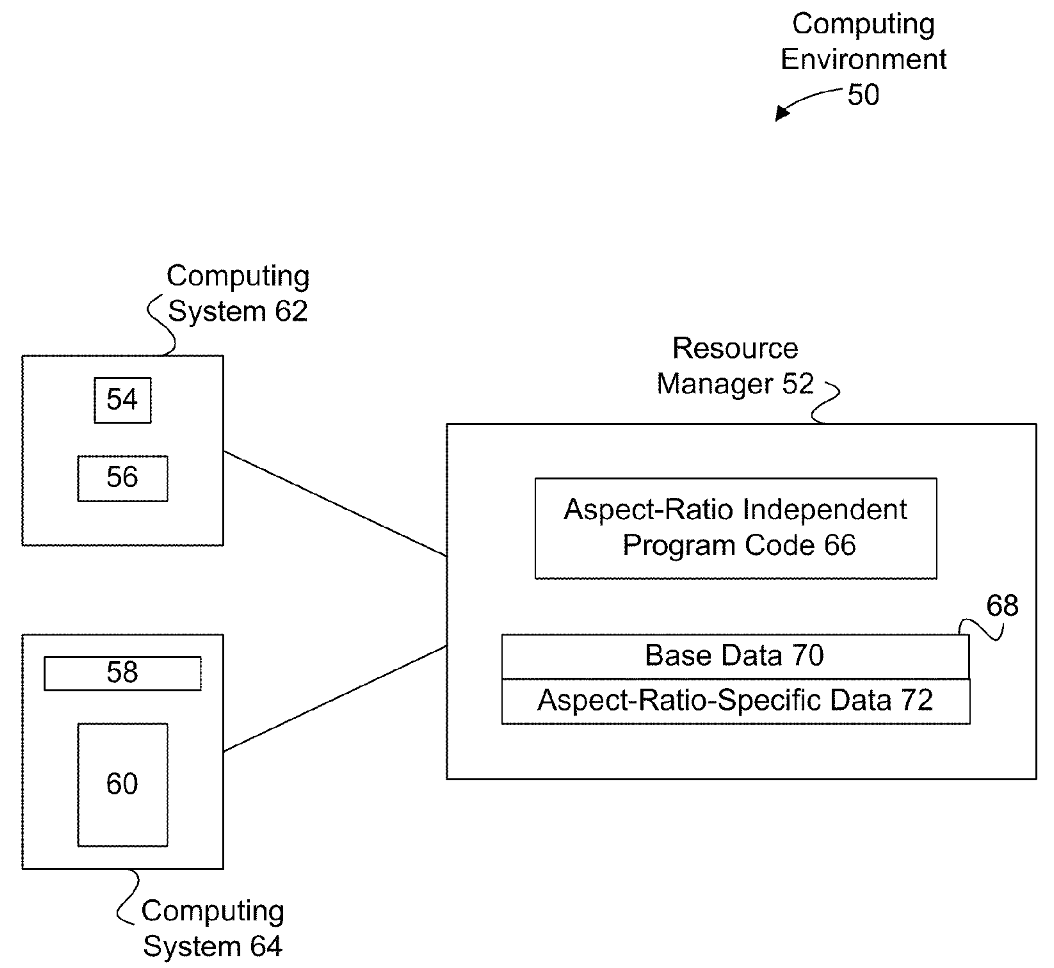
FIGS. 1E-1F depict exemplary computing environments in accordance with various embodiments of the invention.

FIG. 1E depicts an exemplary computing environment 50 in accordance with one aspect of the invention. The exemplary computing environment 50 includes computing system (e.g., gaming machines) 62 and 64. In addition, a number of resources can be associated (e.g., configured) for each of the computing systems. These resources include displays 54 and 56 associated with the computing system 62 and displays 58 and 60 associated with the computing system 64. Referring to FIG. 1E, a resource manager 52 can effectively manage displays 54, 56, 58 and 60 in the computing environment 50. More particularly, the resource manager 52 can determine the content to be displayed for various aspect-ratios associated with the displays in the computing environment 50. In other words, the resource manager 52 can determine the content to be displayed on displays 54 and 56 configured for the computing system 62 and content to be displayed on the displays 58 and 60 configured for the computing system 64 based on the aspect ratio of each display. It will be appreciated that each of the displays 54, 46, 58 and 60 can have a different aspect ratio. As such, content provided for display on each of the displays 54, 46, 58 and 60 may vary depending on the display aspect ratio. Furthermore, a common program code 66 (e.g., a computer game) can be used even though content displayed on each of the displays 54, 56, 58 and 60 can be effectively adjusted for various aspect ratios by the resource manager 52. In effect, the same computer program code 66 can be used to manipulate data and provide any desired functionality (e.g., a video game) regardless of the aspect ratio. As such, the computer program code 66 can effectively be an aspect-ratio independent program used regardless of the aspect ratios associated with the displays 54, 56, 58 and 60. By way of example, the aspect-ratio independent program code 66 can be a computer-graphics game (e.g., video poker game). As such, the computer-graphics game can be computer program code developed independent of any particular aspect ratio in accordance with one aspect of the invention. However, it will also be appreciated that the computer program code 66 can also be computer program code originally developed for a particular aspect ratio. In any case, the resource manager 52 can determine the appropriate content to be displayed for a particular aspect ratio when the computer program code 66 is executed. By way of example, the computer program code 66 can be a computer game (e.g., a video poker game that is executed on a gaming machine in a casino). This means that the same computer game can be executed, yet the content can be varied depending on the aspect ratio associated with a display so that, for example, cards can be depicted differently on a widescreen that what is depicted on a standard screen in order to adjust for the widescreen aspect ratio to provide a more consistent gaming experience. Generally, content including audio, video, audio-visual content can be tailored for different aspect ratios even though a single computer program code is used for various aspect ratios associated with displays 54, 56, 58 and 60.

In order to vary content for different aspect ratios and/or allow a single computer program code to effectively serve various aspect-ratios, an Aspect Ratio Adaptable Data Set (ARADS) 68 is provided in accordance with one aspect of the invention. Generally, the Aspect Ratio Adaptable Data Set (ARADS) can include base data 70. It will be appreciated that the base data 70 can, for example, be aspect-ratio independent data 70 provided for various aspect ratios. As such, the aspect-ratio independent data 70 can serve as base or common data for various aspect ratios. Alternatively, base data 70 can be data that was originally designed for a particular aspect ratio, but used as a basis for display content on other aspect ratios. In any case, the base data 70 can serve as a basis for displaying content on various aspect ratios. In addition to the base data (e.g., aspect-ratio independent data), aspect-ratio specific data 72 can be provided to better address each individual aspect ratio. The aspect-ratio specific data 72 can include data specifically provided for one or more specific aspect-ratios. In general, the aspect-ratio specific data can complement and/or replace the base data 70 in order to provide better content for a specific aspect ratio. The Aspect Ratio Adaptable Data Set (ARADS) is discussed in greater detail below. It should be noted that the resource manager 52 can effectively determine the appropriate content for display for a particular aspect-ratio. By way of example, the resource manager 52 can determine that for the aspect ratio associated with display 54, a particular portion of aspect-ratio specific data 72 should be used in addition and/or instead of the base data 70. This means that the resource manager 52 can, for example, determine aspect-ratio specific data 72 that is an exact or close match to the aspect ratio associated with the display 54. Therefore, the resource manager 52 can effectively determine the best, most suitable and/or best available content for a particular display aspect ratio associated with a display used for displaying content associated with the aspect-ratio independent program code 66, thereby allowing a single program (e.g., a computer game) to be executed for numerous aspect ratios and yet allowing enough flexibility to tailor content for a particular aspect ratio as much as it is desired. For example, for a first aspect ratio, there may be need for little or no aspect-ratio-specific data, but for a second aspect ratio, most or even the entire base data may be ignored and/or overwritten as content is primarily or entirely taken from aspect-ratio-specific data provided for the second aspect ratio. It will also be appreciated that a significant portion of Aspect Ratio Adaptable Data Set (ARADS) can be data used for various aspect ratios. This means that the base data 70 can be a significant portion of the ARADS, thereby requiring less storage, maintenance, testing and/or regulatory approval that would be required if computer program code and/or data is developed for each specific aspect ratio.

Figure 1F:
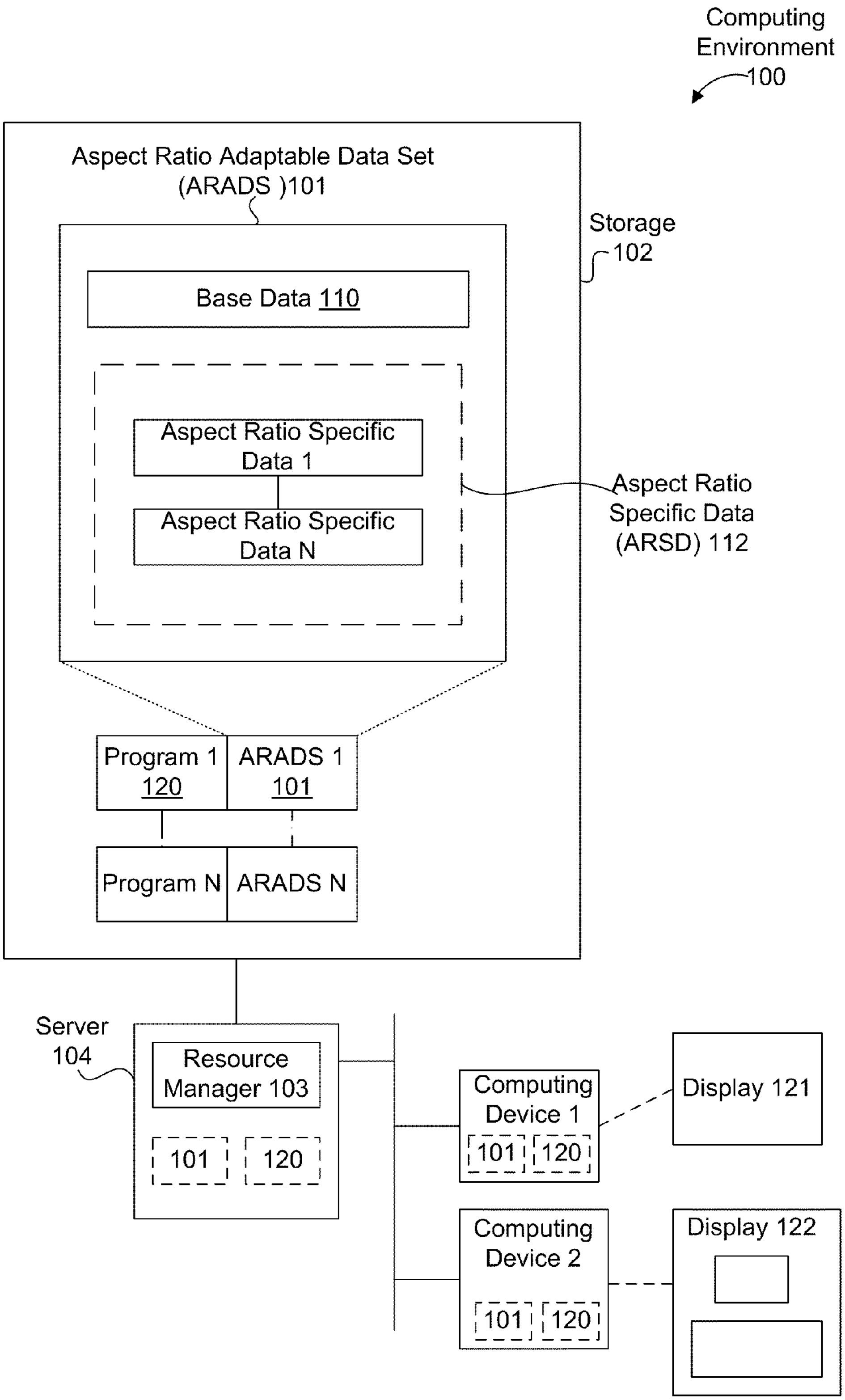

FIG. 1F depicts an exemplary computing environment 100 in accordance with one embodiment of the invention. Referring to FIG. 1F, the computing environment 100 includes computing system or devices (e.g., computer, gaming-machines) 1 and 2 that can display content (e.g., various graphical objects) respectively on displays 121 and 122. It should be noted that displays 121 and 122 can have different aspect ratios. As such, the same content (e.g., graphical component or object) may appear differently (e.g., with a different look and feel) on displays 121 and 122. It should also be noted two or more displays can be configured for each of the computing devices 1 and 2 and/or a display 122 can, for example, be comprised of two or more individual display units of varying aspect ratios. As such, several different display aspect ratios can be used in the computer environment 100. It should also be noted that a resource manager 103 can be provided by the server 104.

In order to accommodate various aspect ratios, an aspect Ratio Adaptable Data Set (ARADS) 101 is provided for the computing environment 100. Referring to FIG. 1E, the Aspect Ratio Adaptable Data Set (ARADS) 101 can be stored in a storage (e.g., database, Random Access Memory) 102 and/or the server 104 and/or computing systems 1 and 2. It will be appreciated that the Aspect Ratio Adaptable Data Set (ARADS) 101 provides the base data 110 (e.g., aspect ratio independent data, data originally designed for a particular aspect ratio) and aspect-ratio-specific data 112. The base data 110 can, for example, include a set of base (or common) objects designed to be displayed for a plurality of different aspect ratios (i.e., data displayed) irrespective of the particular aspect ratio of the display. As another example, the base data 110 can also be data originally developed for a particular aspect ratio. In general, base data 110 can be used as a base or basis for displaying content for various aspect ratios. On the other hand, the aspect-ratio-specific data 112 includes data specifically provided for one or more different aspect ratios. The aspect-ratio-specific data 112 can complement the base data 110 and/or replace a portion or the entire base data 110 for a particular aspect ratio. Typically, the aspect-ratio-specific data 112 can be effectively combined with the base data 110 in order to provide additional graphical components and/or overwrite one or more graphical components of the base data 110.

More particularly, the aspect-ratio-specific data 112 can include a set of data for a plurality of different aspect ratios (Data1-DataN). Thus, in order to display content for a particular aspect ratio (aspect ratio I), the combination of the base data 110 and a particular aspect-ratio-specific data (Data I) from the set of aspect-ratio-specific data (ARSD) 112 can be used. By way of example, the combination of the base data 110 and aspect-ratio-specific data 1 can be used to display content on the display 121 with a first aspect ratio. However, aspect-ratio-specific data 2 is used in combination with the base data 110 to display content on the display 122 (or one of its display units) with a corresponding second aspect ratio, and so on.

It will be appreciated that aspect-ratio specific data 112 can ensure that one or more presentation or display criteria are met. It should also be noted that the Aspect Ratio Adaptable Data Set (ARADS) 101 can be associated with a computer program (e.g., game for a gaming machine) 120 which may also be stored in the storage 102, server 104 and/or computing devices 1 and 2. In general, each of a plurality of computer programs ($G_1, \ldots G_N$) can be associated respectively with a plurality Aspect Ratio Adaptable Data Sets ($ARADS_1, \ldots ARADS_N$) as suggested by FIG. 1F.

Figure 2A:
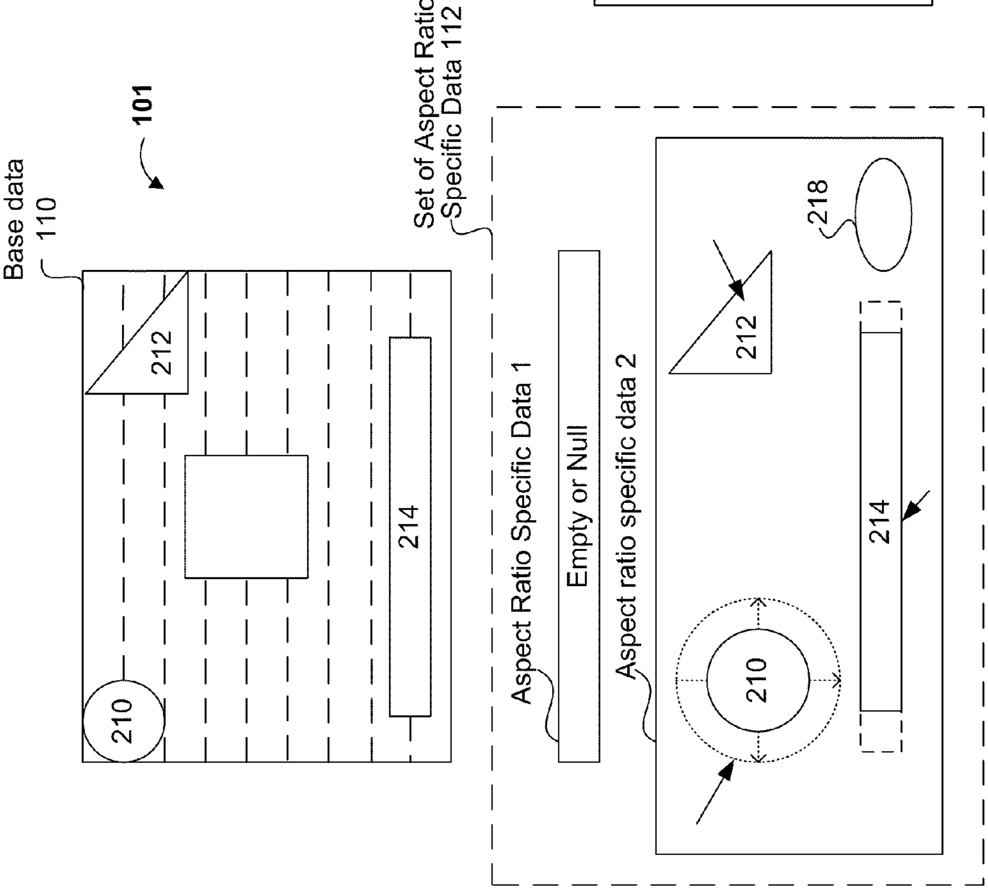
FIGS. 2A-2B depict a simple representation of the Aspect Ratio Adaptable Data Set (ARADS) in accordance with one embodiment of the invention.
Figure 2B:
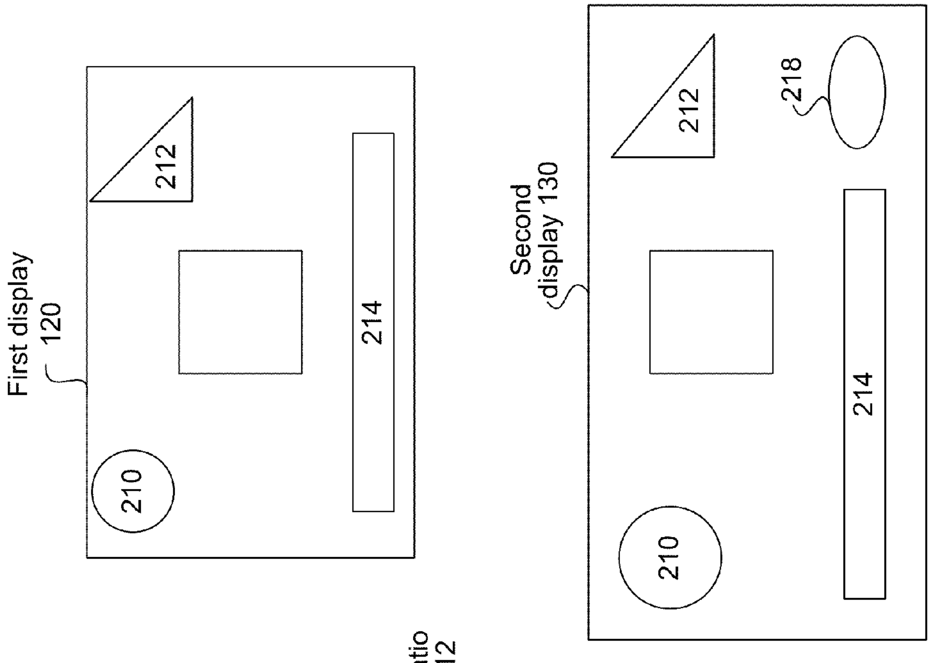

To further elaborate, FIG. 2A depicts a simple representation of the Aspect Ratio Adaptable Data Set (ARADS) 101 in accordance with one embodiment of the invention. Referring to FIG. 2A, the Aspect Ratio Adaptable Data Set (ARADS) 101 includes base data 110 and aspect-ratio-specific data 112. It should be noted that for sake of simplicity, data representing graphical objects (e.g., data specifies the dimension of an object and/or data that can be used to display an object) is represented in FIG. 2B as an object (e.g., circle 210, triangle 212, rectangle 214). Furthermore, for simplicity, only a few objects are represented to demonstrate how the combination of the base data 110 and aspect-ratio-specific data 112 can be used to display graphical objects (or components, or items, or elements) for various aspect ratios in accordance with one or more presentation criteria (e.g., maintaining the same look and feel for the displayed content irrespective of aspect ratio). Those skilled in the art will know that the data 110 and/or 112 can include numerous other objects. These other objects are represented with lines for the base data 212 shown in FIG. 2B. Those skilled in the art will also appreciate that the set of base objects used in the base data 110 could have been originally designed for a particular aspect ratio (e.g., standard screen) as has been the standard practice. In the example shown in FIG. 2A, the base data 110 can, for example, be data originally designed for a particular aspect ratio, namely, a first aspect ratio associated with a first display 120 (shown in FIG. 2B). As such, there is no need to provide aspect-ratio-specific data to represent these objects on the first display 120 because the aspect ratio has not changed. In other words, the aspect-ratio-specific data 1 is effectively empty of equal to null. Thus, the base data 110 is sufficient to display data on the display 120 or displays with the same or similar aspect ratio as the first aspect ratio associated with a first display 120. However, for displaying content on the display 130 with a second aspect ratio, the aspect-ratio-specific data 2 can be provided. Generally, the aspect-ratio-specific data 2 can be effectively combined with the base data 110, provide additional data and/or replace the base data 110 in part or in its entirety. This allows displaying content in accordance with one or more criteria irrespective of the aspect ratio (e.g., maintaining the same look and feel, insuring the critical information is not omitted, maximizing use of the screen).

In general, aspect-ratio-specific data can complement the base data 110 in order to ensure that one or more criteria (e.g., presentation criteria) are met. As such, the aspect-ratio-specific data 2 can, for example, describe the changes or additions that need to be made to the base data 110 in order to display the objects in accordance with a design criterion (e.g., design criteria, e.g., maintaining the same look and feel). Those skilled in the art will appreciate that aspect-ratio-specific data 112 can, for example, change (e.g., scale down, scale up) a base object, replace a base object, move a base object, or change its relationship with other objects, or introduce a new object or a new relationship between one or more objects. As will be discussed below, aspect-ratio-specific data (e.g., aspect-ratio-specific data 2) can be generated using a graphics package in accordance with one embodiment of the invention. This allows a designer (e.g., a human) to conveniently define aspect-ratio-specific data in accordance with various presentation or graphics design criteria. As such, there is no practical limitation to changes and/or additions that can be made to the base data 110. Referring to FIG. 2A, aspect-ratio-specific data 2 can be designed, for example, to effectively rescale and/or move objects 210, 212 and 214 as shown on the first display 120 in order to display them on the second display 130. By way of example, an object 210 can be rescaled and moved to maintain the same look and feel for content displayed on the second display 130 as that displayed on the first display 120. The object 210 is depicted in the first display 120 and can be originally designed for the first aspect ratio. However, as suggested by FIG. 2A, object 210 can be moved and rescaled for display on the second display 130. Those skilled in the art will appreciate that a graphics package can be used to make the modifications to original objects 210, 212 and 214 as may have been designed for s first aspect ratio to obtain modified objects for display on the second aspect ratio associated with the second display 130. Furthermore, data representing the modified objects for display on the second display 130 can be generated and saved as aspect-ratio-specific data 2. As such, it is possible to use aspect-ratio-specific data 2 to, for example, ensure the an object 214 that provides critical information (e.g., game score, credit) is not lost when the second aspect ratio is used to display content originally designed for the first aspect ratio. In fact, critical information can be displayed in accordance with one or more design criteria. Furthermore, aspect-ratio-specific data 2 can be used to, for example, maintain in the same look and feel for the displayed content regardless of the aspect ratio used, as well as maximizing the use of area available on the second aspect ratio.

Although base data 110 can be data originally designed for a particular aspect ratio, those skilled in the art will also appreciate that base data 110 can be designed to be independent of any aspect ratio in accordance with one aspect of the invention. This means that a set of aspect ratio independent objects can be designed or identified to serve as base data for various aspect ratios. Such objects may have characteristics common to various aspect ratios. These aspect ratio independent objects can serve as a set of base objects (e.g., common objects, initial objects) as basis for displaying content for multiple aspect ratios. Furthermore, an aspect ratio independent object can be modified to obtain an aspect-ratio-specific object and/or additional aspect specific objects can be provided to complement the base objects in order to address a particular aspect ratio when there is a need.

In any case, in order to display objects for a particular aspect ratio, the combination of base data (or objects) and aspect-ratio-specific data (or objects) can be effectively used to display contents for various aspect ratios. By way of example, an aspect-ratio-specific object can effectively modify and/or replace a base object or add a new object to the set of base objects. Referring again to FIG. 2, aspect-ratio-specific data 2 can, for example, add an object 218 in addition to the objects in the base data 110. As another example, aspect-ratio-specific data 110 may include an object that is a modification (or directions to modify) of a base object and/or move a base object or change its relationship with other objects.

Those skilled in the art will also appreciate that the base data 110 can be initially used to display objects on the second display 130 before aspect-ratio-specific data 2 is used to effectively adjust the display for the second aspect ratio associated with the second display 130. Alternatively, aspect-ratio-specific data 2 can be used to effectively modify the base data 110 before displaying the objects on the second display 130. In other words, base data 110 can be modified, based on the aspect-ratio-specific data to generate the data (modified data) needed to display objects on the second display 130.

Various aspects of the content that can be varied and effectively customized for various aspect ratios include, for example, layout of content (e.g., position, size, and/or number of graphical objects), and textual properties (e.g., font type, font size, spacing, formatting, paragraph indenting and/or spacing, line and page breaks, bullets, numbering and/or character types and/or languages). Those skilled in the art will appreciate that graphical objects can be modeled in three dimensions (3D) using 3D modeling. For example, content representing three dimensional reels associated with a reel-based game on a gaming machine can be modeled in 3D. However, these models can be different for different aspect ratios so that, for example, 3D models of reels for the standard screen aspect ratio is different than the 3D models of the same reels for a wide screen aspect ratio. Animation or movement of objects can also be varied and effectively tailored for various aspect ratios in a similar manner as a single scene can be modified. By way of example, even the movement of an object (e.g., movement of a ball) may be designed to be different for a wide screen aspect ratio than a standard aspect ratio. In general, different images, bitmaps, movies and/or sounds, can be provided for different aspect ratios as the aspect-ratio-specific data. By way of example, a different movie can be provided for a wide screen aspect ratio than a standard aspect ratio. The game can be formatted differently or completely different movies can be provided. However, the movie(s) can be effectively part of the same game provided by the game computer program. It should be noted that audio content can also be varied for different aspect ratios. For example, audio for left and right channels can be provided for a standard aspect ratio (or display), but audio for a wide screen aspect can include a central channel in addition to the left and right channels. Some exemplarily aspect ratios include: standard, widescreen, double-wide, narrow, double-narrow, 5:4, 4:3, 9:16, and 16:19. It is clear that the invention can be used to accommodate any aspect ratio including those that may developed in the future as the invention does not pose any assumptions or limits on the aspect ratios that can be used to display content.

It will also be appreciated that aspect ratio adaptable data 100 (shown in FIG. 1F) can facilitate dynamic display of objects for various aspect ratios in accordance with another aspect of the invention. Referring back to FIG. 1E, a computer program (e.g., game) 120 can, for example, be downloaded by the server 104 to computing devices 1 and 2. As noted above, the computer program 120 can be associated with the Aspect Ratio Adaptable Data Set (ARADS) 101 which can effectively describe the objects that are displayed and/or manipulated by the computer program 120. Those skilled in the art will know that Aspect Ratio Adaptable Data Set (ARADS) 101, or at least a portion of it, can, for example, be packaged with the computer program 120, or the computer program 120 can effectively include the Aspect Ratio Adaptable Data Set (ARADS) 101. In any case, in order to execute the computer program 120 on the computing devices 1 and/or 2, the resource manager 103 on the server 104 and/or the computing devices 1 and 2) can determine the aspect ratio(s) of the display(s) 121 and/or 122 which are respectively used by the computing devices 1 and 2. Those skilled in the art will also know that the aspect ratios can, for example, be determined by querying the displays 121 and 122. Further, based on the aspect ratio (or an approximation of the aspect ratio), the resource manager 103 can determine the appropriate aspect-ratio-specific data (provided in the set of aspect-ratio-specific data 112 accompanying base data 110) to be used to display objects on displays 121 or 122. By way of example, when the resource manager 103 determines that the second display 2 has a second aspect ratio, the server 104 identifies or selects the aspect-ratio-specific data 2 as that appropriate data to be combined with the base data 110. The appropriate aspect-ratio-specific data can, for example, be selected by finding the exact or closest match to the second aspect ratio. The server 104 can send the computer game 120, and the combination of the base data 110 and aspect-ratio-specific data 2 to the computing device 2 for display on the second display 122, and so on. Those skilled in the art will also understand that it is also possible to download the complete set of Aspect Ratio Adaptable Data Set (ARADS) 101, including both base data 110 and the set of aspect-ratio-specific data 112, to computing system 2. It is also possible to configure the computing system 2 to select the appropriate aspect-ratio-specific data to use for display(s) it uses at a given time. In any case, the appropriate data can be determined dynamically for a particular aspect ratio. As such, the Aspect Ratio Adaptable Data Set (ARADS) 101 allows use of various displays and aspect ratios in an environment where several computer programs can be configured for several different aspect ratios at a given time. The Aspect Ratio Adaptable Set (ARADS) 101 also allows the flexibility to change the aspect ratios used as needed to accommodate different and/or new aspect ratios by adding different and/or new aspect-ratio-specific data as needed.

Figure 3:
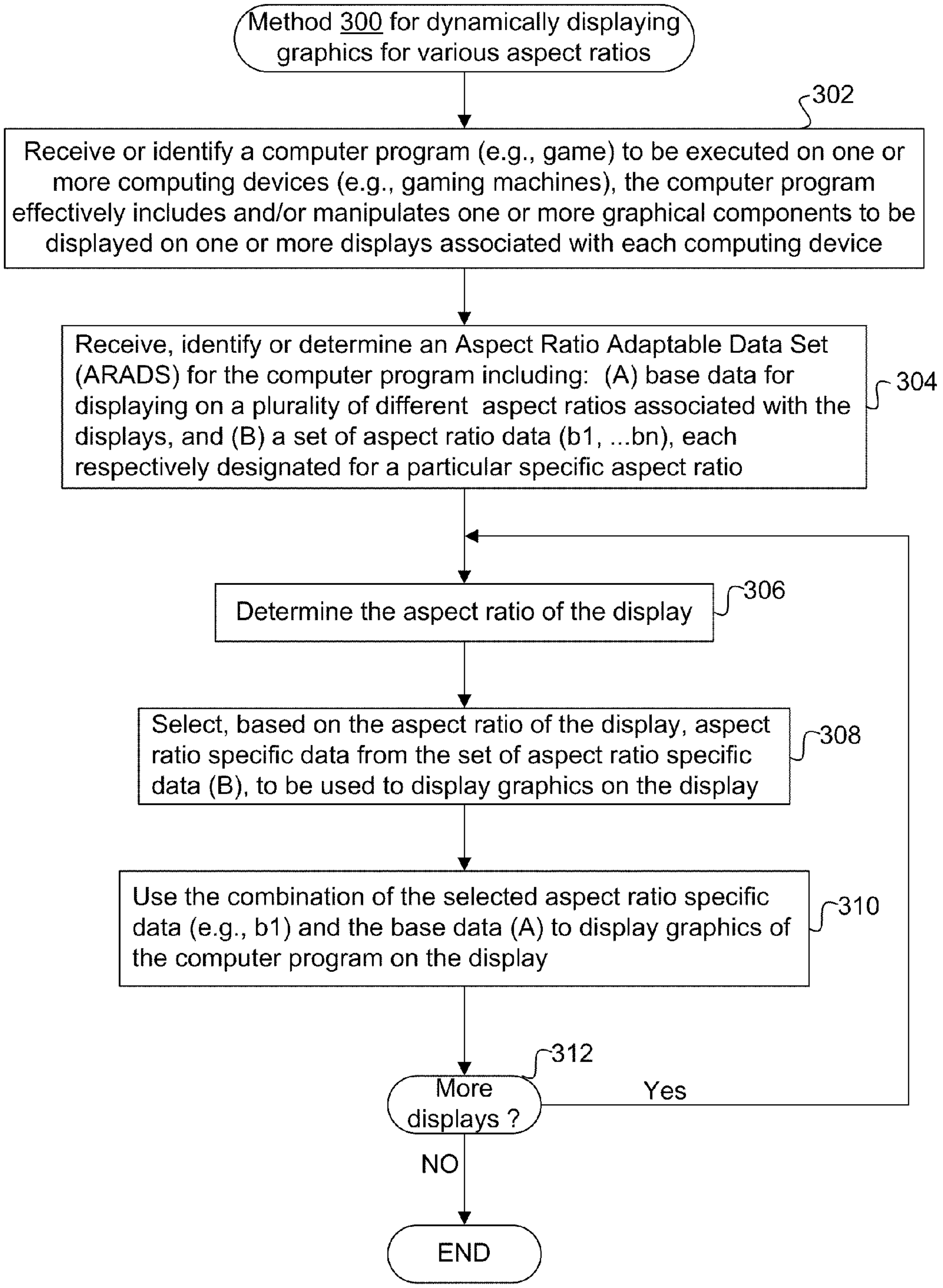
FIG. 3 depicts a method for dynamically displaying graphics (e.g., computer graphics associated with a game on a gaming-machine) for various aspect ratios in accordance with one embodiment of the invention.

FIG. 3 depicts a method 300 for dynamically displaying graphics (e.g., computer graphics associated with a game on a gaming-machine) for various aspect ratios in accordance with one embodiment of the invention. Initially, a computer program (e.g., computer game) that can be executed on one or more computing devices (e.g., gaming-machines) is received or identified (302). The computer program effectively includes and/or manipulates one or more graphical objects (e.g., software components, items, elements, or objects) to be displayed on one or more displays associated with each of the computing devices that can execute the computer program. After the computer program is received and/or identified (302), at least one Aspect Ratio Adaptable Data Set (ARADS) for the computing program is received, identified and/or determined (304). The Aspect Ratio Adaptable Data Set (ARADS) includes (a) base data intended for displaying content on a plurality of different aspect ratios associated with one or more displays configured for the computing devices, and (b) a set of aspect-ratio-specific data ($b_1, \ldots b_n$) each designated for a particular aspect ratio.

Next, the aspect ratio of a display(s) intended for displaying graphics of the computer program is determined (306). Thereafter, based on the aspect ratio of the display, aspect-ratio-specific data is selected from the set of aspect-ratio-specific data in order to display the graphics on the display. Accordingly, the combination of the selected aspect-ratio-specific data (e.g., b1) and the base data (a) can be used to display the graphics. Subsequently, it is determined (312) whether there are other displays to consider. Method 300 ends if it is determined that there are no more displays to consider. However, it is determined (312) that there is at least one display to consider, aspect ratio is determined (306) for the display. Thereafter, method 300 proceeds in a similar manner as discussed above to select (308) aspect-ratio-specific data and display (310) the graphics. Method 300 ends when it is determined (312) that there are no more displays to consider.

Figure 4A:
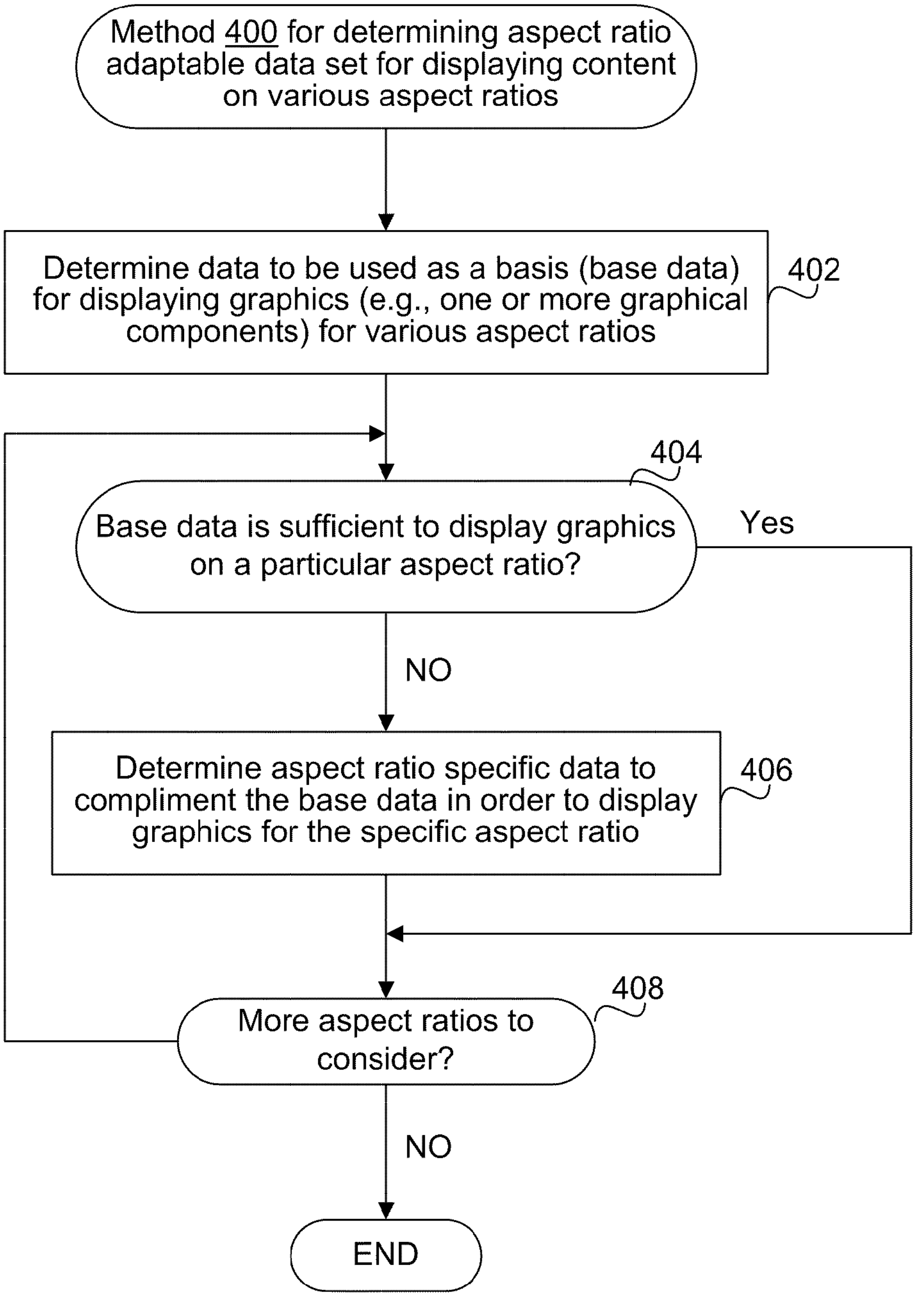
FIG. 4A depicts a method for determining Aspect Ratio Adaptable Data for various aspect ratios associated with multiple displays (or display types) in accordance with another aspect of the invention.

FIG. 4A depicts a method 400 for determining an Aspect Ratio Adaptable Data Set (ARADS 101 shown in FIG. 1) for displaying content on a plurality of different aspect ratios associated with multiple displays (or display types) in accordance with another embodiment of the invention. Initially, data that can be used as a basis (base data) for displaying graphics (e.g., one or more graphical objects, items, elements, or components) for a plurality of different aspect ratios is determined (402). Next, it is determined (404) whether the base data is sufficient to display the graphics for a particular aspect ratio. The graphics can, for example, be associated with a computer program (e.g., computer game executable by a gaming machine). If it is determined (404) that the base data is not sufficient to display graphics for a particular aspect ratio, aspect-ratio-specific data is determined. Generally, the aspect-ratio-specific data can complement and/or replace the base data and/or provide additional data. As such, the aspect-ratio-specific data that can effectively complement the base data in order to better address a particular aspect ratio. Determining (404) whether the base data is sufficient and determining (406) the aspect-ratio-specific data are discussed in more detail below in accordance with one embodiment of the invention. By way of example, determining (404) whether the base data is sufficient for displaying content on a particular aspect ratio can be simply made by determining whether aspect-ratio-specific data has exists and/or has been provided for the particular aspect ratio. As such, the determining (406) of aspect-ratio-specific data can, for example, include selecting the appropriate aspect-ratio-specific data when it exists. Referring back to FIG. 4A, after the aspect-ratio-specific data is determined (406), it is determined (408) whether more aspect ratios are to be considered. Accordingly, additional aspect-ratio-specific data can be determined (406) for additional aspect ratios if it is determined (408) that more aspect ratios are to be considered. Method 400 ends when it is determined (408) that are no more aspect ratios to consider.

Figure 4B:
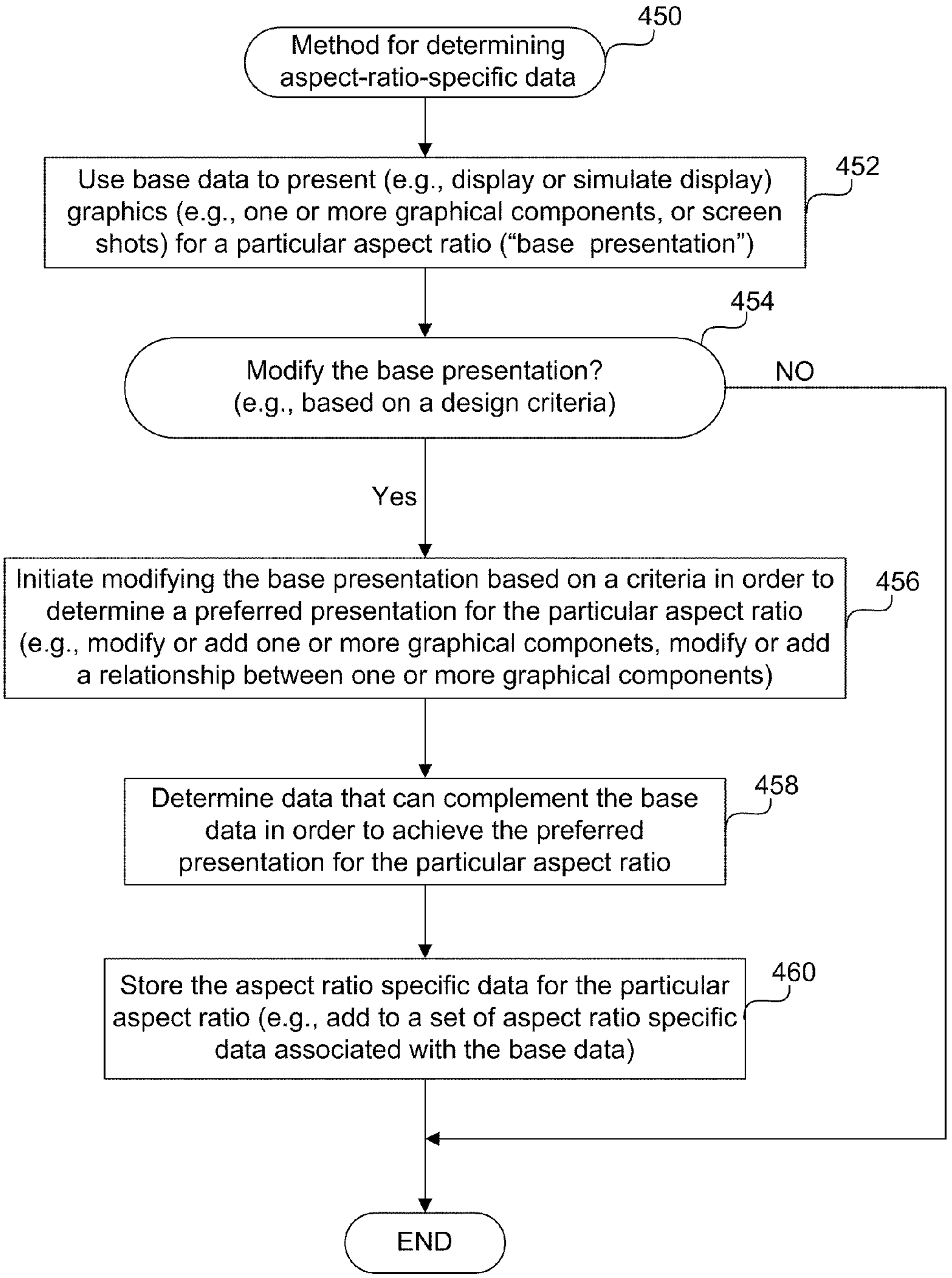
FIG. 4B depicts a method for determining aspect-ratio-specific data in accordance with one embodiment of the invention.

FIG. 4B depicts a method 450 for determining aspect-ratio-specific data in accordance with one embodiment of the invention. Method 450 depicts in greater detail determining (404) whether base data is sufficient to display graphics, and determining (406) aspect-ratio-specific data (shown in FIG. 4A). Referring now to FIG. 4B, initially, base data is used to present (452) (e.g., display or simulate display) graphics (e.g., layout of one or more graphical components or screenshots) for a particular aspect ratio. This initial presentation (452) can be referred to as the "base presentation." Those skilled in the art will know that, for example, a graphics package (or application) can be used to display the base data as the base presentation.

After the base data is presented (452) as the base presentation, it is determined (454) whether to modify the base presentation to ensure that one or more presentation criteria are met. This determination (454) can, for example, be made by visually inspecting the layout of the graphical components or screen shots. If it is determined (454) to modify the base presentation, modification of the base presentation is initiated (456) in order to achieve a preferred or modified presentation. The base presentation can, for example, be modified based on a presentation criterion (e.g., design criteria such as maintaining the same look and feel for different aspect ratios, or maximizing use of the display screen ensuring that the critical information is not omitted, ensuring quality of displayed content). Those skilled in the art will appreciate that, for example, a graphics package can be used to modify and/or add various graphical components and/or relationships between them. Subsequently, data representing the preferred or modified presentation is determined (458). Typically, this data can complement the base data to achieve the preferred or modified representation. In other words, aspect-ratio-specific data that can complement the base data in order to achieve the one or more presentation criteria can be determined (458). Again, a graphics package can be used to determine (458) the aspect-ratio-specific data that represents the preferred or modified presentation. Finally, the aspect-ratio-specific data is stored (460) for the particular aspect ratio. The aspect-ratio-specific data can, for example, be added to a set of aspect-ratio-specific data associated with base data.

Figure 5A:
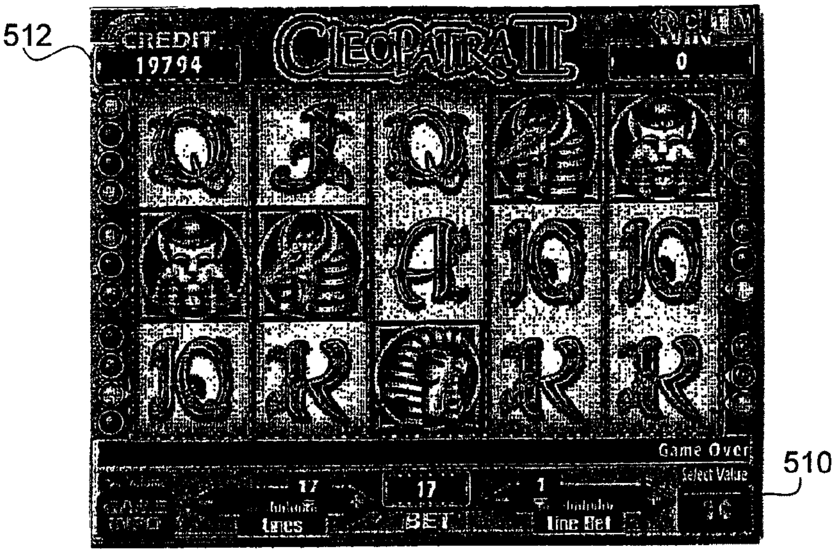
Figure 5B:
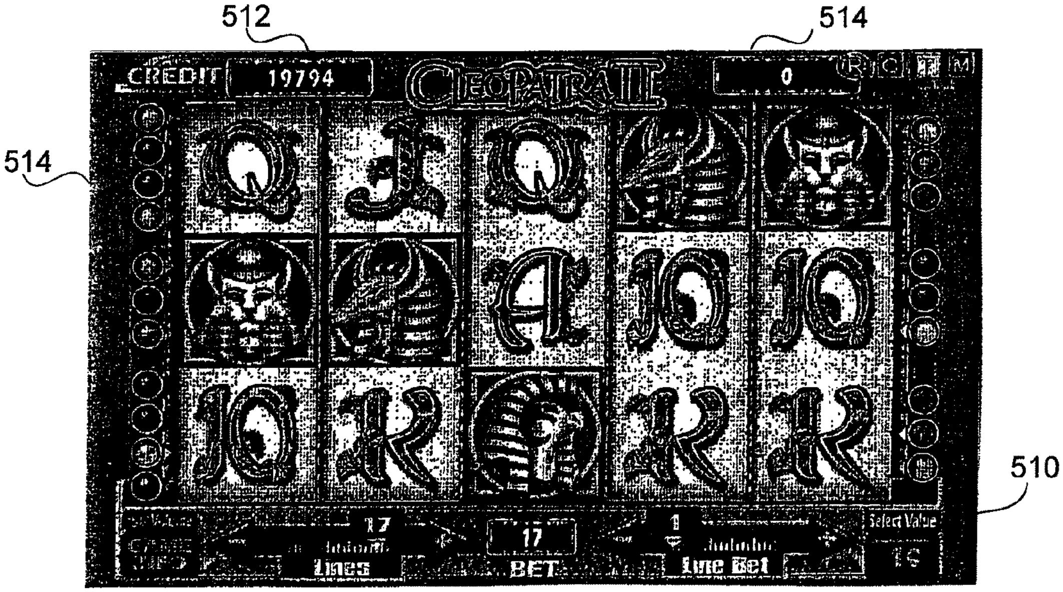

Screen shots 5A-5B depict graphics for a computer game adjusted for a widescreen aspect ratio in accordance with one embodiment of the invention. More particularly, FIG. 5A depicts content displayed for a gaming machine. This content is displayed for a 5:4 aspect ratio (1280×1024). FIG. 5B depicts the same content (also shown in FIG. 5A) adjusted for a widescreen aspect ratio in accordance with the techniques described above. Initially, it should be noted that the content is displayed for the widescreen (FIG. 5B) with the same look and feel as that displayed on the original screen (5:4 Aspect Ratio of FIG. 5A). It is further intended that the use of the space depicted in FIG. 5B (widescreen) is maximized to the extent that the same look and feel can be preserved. In addition, the information 510 considered to be critical to the gaming environment is preserved (e.g., no information is omitted). Also, quality of display content is preserved so that content is clear and readable. To achieve these objectives, various graphical objects or group of objects have been resized. Furthermore, individual components have been moved and/or rescaled (e.g., credit score box 512 has been moved). Those skilled in the art will appreciate that a graphics-package can, for example, be used to implement these changes. In other words, a human being can visually inspect screens and conveniently redesign a standard screen (FIG. 5A) for the widescreen aspect ratio shown in FIG. 5D when content has been redesigned for display on the widescreen shown in FIG. 5B, aspect-ratio-specific data representing the modified screen can be generated and stored.

Those skilled in the art will appreciate that there is no need to modify the source image or games elements, yet content can appear as crisp and clear as that displayed for the original content (FIG. 5A). A display engine that is not pixel/dimension/layer dependent can be used to produce content for various aspect ratios. The display engine does not require a 1:1 (one to one) pixel to image ratio. In addition, the source content can be projected on three-dimensional (3D) surfaces and would not be locked into pixel coordinates. This allows placement of objects within a screen space effectively regardless of original content size or expected aspect ratio. Referring to screen shots depicted in FIGS. 5A and 5B, it will be appreciated that no source image used to display on the standard screen (FIG. 5A) or game elements construction (e.g., screen constructions) needs to be modified to achieve the results depicted in FIG. 5B. Further, no game code or script needs to be changed and no system needs to be reloaded to display contents for the widescreen depicted in FIG. 5B. A set of three-dimensional files (3D) model files can be referenced and reprocessed by the display engine noted above. This approach is flexible and allows, for example, various game designers to modify source content to use the additional width of the widescreen differently than what is suggested in FIG. 5B. By way of example, new backgrounds, prompts, or movies can be introduced by redesigning the graphical components or interfaces. Yet one advantage of this approach is that, rather than scaling the entire screen, individual 3D elements (or objects) can be re-positioned, maintaining the original look and feel of the elements, thus avoiding undesirable effects (e.g., "a squashed" appearance).

FIG. 6 depicts dual aspect ratio content provided for a Audio-Visual Processing or Presentation (AVP) system in accordance with one embodiment of the invention. It will be appreciated that dual aspect ratio can be provided by modifying an existing AVP system. More particularly, resource management utilities can serve as a core to the audio-visual presentation system. It will be appreciated that the process for implementing dual or multiple aspect ratio support can, for example, be done in a similar manner as process currently used for providing multiple-language support as is know to those skilled in the art.

Referring to FIG. 6, game resource structure 600 that supports dual aspect content includes a current game resource structure 602, a default (standard or base) directory 604, and an additional widescreen directory branch 6046. The widescreen director 606 can include resources that have been modified for presentation on a widescreen. These modifications may be as limited to a few graphical components or elements provided for original (or model) files in the default directory 604. Optionally, new sounds, animations, light patterns can be presented in the widescreen (directory) 606. The amount of new contents and/or modifications can depend on the amount of needed adjustment for individual graphical components or elements. Those skilled in the art will also appreciate that the reverse process, namely, adjusting content designed for widescreen to the standard aspect ratio can be achieved using the techniques disclosed above. It is apparent that the general principles and aspects of the invention are not dependent on any particular aspect ratio. Accordingly, the invention can accommodate numerous aspect ratios in existence today, as well as those that may be developed in the future.

FIG. 7 depicts a video gaming-machine 2 that can be used in monitoring and controlling gaming-environment in accordance with one embodiment of the invention. Machine 2 includes a main cabinet 4, which generally surrounds the machine interior (not shown) and is viewable by users. The main cabinet includes a main door 8 on the front of the machine, which opens to provide access to the interior of the machine. Attached to the main door are player-input switches or buttons 32, a coin acceptor 28, and a bill validator 30, a coin tray 38, and a belly glass 40. Viewable through the main door is a video display monitor 34 and an information panel 36. The display monitor 34 will typically be a cathode ray tube, high resolution flat-panel LCD, or other conventional electronically controlled video monitor. The information panel 36 may be a back-lit, silk screened glass panel with lettering to indicate general game information including, for example, a game denomination (e.g. $0.25 or $1). The bill validator 30, player-input switches 32, video display monitor 34, and information panel are devices used to play a game on the game machine 2. The devices are controlled by circuitry (e.g. the master gaming controller) housed inside the main cabinet 4 of the machine 2. Many possible games, including mechanical slot games, video slot games, video poker, video black jack, video pachinko and lottery, may be provided with gaming-machines of this invention.

The gaming-machine 2 includes a top box 6, which sits on top of the main cabinet 4. The top box 6 houses a number of devices, which may be used to add features to a game being played on the gaming-machine 2, including speakers 10, 12, 14, a ticket printer 18 which prints bar-coded tickets 20, a key pad 22 for entering player tracking information, a florescent display 16 for displaying player tracking information, a card reader 24 for entering a magnetic striped card containing player tracking information, and a video display screen 42. The ticket printer 18 may be used to print tickets for a cashless ticketing system. Further, the top box 6 may house different or additional devices than shown in the FIG. 4. For example, the top box may contain a bonus wheel or a back-lit silk screened panel which may be used to add bonus features to the game being played on the gaming-machine. As another example, the top box may contain a display for a progressive jackpot offered on the gaming-machine. During a game, these devices are controlled and powered, in part, by circuitry (e.g. a master gaming controller) housed within the main cabinet 4 of the machine 2.

Understand that gaming-machine 2 is but one example from a wide range of gaming-machine designs on which the present invention may be implemented. For example, not all suitable gaming-machines have top boxes or player tracking features. Further, some gaming-machines have two or more game displays—mechanical and/or video. And, some gaming-machines are designed for bar tables and have displays that face upwards. As another example, a game may be generated in on a host computer and may be displayed on a remote terminal or a remote gaming device. The remote gaming device may be connected to the host computer via a network of some type such as a local area network, a wide area network, an intranet or the Internet. The remote gaming device may be a portable gaming device such as but not limited to a cell phone, a personal digital assistant, and a wireless game player. Those of skill in the art will understand that the present invention, as described below, can be deployed on most any gaming-machine now available or hereafter developed.

Referring back to the example depicted in FIG. 7, when a user wishes to play the gaming-machine 2, he or she inserts cash through the coin acceptor 28 or bill validator 30. Additionally, the bill validator may accept a printed ticket voucher which may be accepted by the bill validator 30 as an indicia of credit when a cashless ticketing system is used. At the start of the game, the player may enter playing tracking information using the card reader 24, the keypad 22, and the florescent display 16. Further, other game preferences of the player playing the game may be read from a card inserted into the card reader. During the game, the player views game information using the video display 34. Other game and prize information may also be displayed in the video display screen 42 located in the top box.

During the course of a game, a player may be required to make a number of decisions, which affect the outcome of the game. For example, a player may vary his or her wager on a particular game, select a prize for a particular game selected from a prize server, or make game decisions which affect the outcome of a particular game. The player may make these choices using the player-input switches 32, the video display screen 34 or using some other device which enables a player to input information into the gaming-machine. In some embodiments, the player may be able to access various game services such as concierge services and entertainment content services using the video display screen 34 and one more input devices.

During certain game events, the gaming-machine 2 may display visual and auditory effects that can be perceived by the player. These effects add to the excitement of a game, which makes a player more likely to continue playing. Auditory effects include various sounds that are projected by the speakers 10, 12, 14. Visual effects include flashing lights, strobe lights or other patterns displayed from lights on the gaming-machine 2 or from lights behind the belly glass 40. After the player has completed a game, the player may receive game tokens from the coin tray 38 or the ticket 20 from the printer 18, which may be used for further games or to redeem a prize. Further, the player may receive a ticket 20 for food, merchandise, or games from the printer 18.

IGT gaming-machines are implemented with special features and additional circuitry that differentiate them from general-purpose computers (e.g., desktop PC's and laptops). Some of these components and features are included in the network devices of the present invention, as appropriate. Some examples of these additional components and features are described below.

A watchdog timer is normally used in IGT gaming-machines to provide a software failure detection mechanism. In a normally operating system, the operating software periodically accesses control registers in the watchdog timer subsystem to "re-trigger" the watchdog. Should the operating software fail to access the control registers within a preset timeframe, the watchdog timer will timeout and generate a system reset. Typical watchdog timer circuits contain a loadable timeout counter register to allow the operating software to set the timeout interval within a certain range of time. A differentiating feature of the some preferred circuits is that the operating software cannot completely disable the function of the watchdog timer. In other words, the watchdog timer always functions from the time power is applied to the board.

IGT gaming computer platforms preferably use several power supply voltages to operate portions of the computer circuitry. These can be generated in a central power supply or locally on the computer board. If any of these voltages falls out of the tolerance limits of the circuitry they power, unpredictable operation of the computer may result. Though most modern general-purpose computers include voltage monitoring circuitry, these types of circuits only report voltage status to the operating software. Out of tolerance voltages can cause software malfunction, creating a potential uncontrolled condition in the gaming computer. Gaming-machines of the present assignee typically have power supplies with tighter voltage margins than that required by the operating circuitry. In addition, the voltage monitoring circuitry implemented in IGT gaming computers typically has two thresholds of control. The first threshold generates a software event that can be detected by the operating software and an error condition generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the computer.

The standard method of operation for IGT slot machine game software is to use a state machine. Each function of the game (bet, play, result, etc.) is defined as a state. When a game moves from one state to another, critical data regarding the game software is stored in a custom non-volatile memory subsystem. In addition, game history information regarding previous games played, amounts wagered, and so forth also should be stored in a non-volatile memory device. This feature allows the game to recover operation to the current state of play in the event of a malfunction, loss of power, etc. This is critical to ensure the player's wager and credits are preserved. Typically, battery backed RAM devices are used to preserve this critical data. These memory devices are not used in typical general-purpose computers.

IGT gaming computers normally contain additional interfaces, including serial interfaces, to connect to specific subsystems internal and external to the slot machine. The serial devices may have electrical interface requirements that differ from the "standard" EIA RS232 serial interfaces provided by general-purpose computers. These interfaces may include EIA RS485, EIA RS422, Fiber Optic Serial, Optically coupled serial interfaces, current loop style serial interfaces, etc. In addition, to conserve serial interfaces internally in the slot machine, serial devices may be connected in a shared, daisy-chain fashion where multiple peripheral devices are connected to a single serial channel.

IGT Gaming-machines may alternatively be treated as peripheral devices to a casino communication controller and connected in a shared daisy chain fashion to a single serial interface. In both cases, the peripheral devices are preferably assigned device addresses. If so, the serial controller circuitry must implement a method to generate or detect unique device addresses. General-purpose computer serial ports are not able to do this.

Security monitoring circuits detect intrusion into an IGT gaming-machine by monitoring security switches attached to access doors in the slot machine cabinet. Preferably, access violations result in suspension of game play and can trigger additional security operations to preserve the current state of game play. These circuits also function when power is off by use of a battery backup. In power-off operation, these circuits continue to monitor the access doors of the slot machine. When power is restored, the gaming-machine can determine whether any security violations occurred while power was off, e.g., via software for reading status registers. This can trigger event log entries and further data authentication operations by the slot machine software.

Trusted memory devices are preferably included in an IGT gaming-machine computer to ensure the authenticity of the software that may be stored on less secure memory subsystems, such as mass storage devices. Trusted memory devices and controlling circuitry are typically designed to not allow modification of the code and data stored in the memory device while the memory device is installed in the slot machine. The code and data stored in these devices may include authentication algorithms, random number generators, authentication keys, operating system kernels, etc. The purpose of these trusted memory devices is to provide gaming regulatory authorities a root trusted authority within the computing environment of the slot machine that can be tracked and verified as original. This may be accomplished via removal of the trusted memory device from the slot machine computer and verification of the secure memory device contents is a separate third party verification device. Once the trusted memory device is verified as authentic, and based on the approval of the verification algorithms contained in the trusted device, the gaming-machine is allowed to verify the authenticity of additional code and data that may be located in the gaming computer assembly, such as code and data stored on hard disk drives.

FIG. 8 shows a block diagram illustrating components of a gaming system 900 which may be used for implementing various aspects of the present invention. In FIG. 8, the components of a gaming system 900 for providing game software licensing and downloads are described functionally. The described functions may be instantiated in hardware, firmware and/or software and executed on a suitable device. In the system 900, there may be many instances of the same function, such as multiple game play interfaces 911. Nevertheless, in FIG. 5, only one instance of each function is shown. The functions of the components may be combined. For example, a single device may comprise the game play interface 911 and include trusted memory devices or sources 909. Each of the described components may be incorporated by various embodiments described with respect to FIGS. 1-8.

The gaming system 900 may receive inputs from different groups/entities and output various services and or information to these groups/entities. For example, game players 925 primarily input cash or indicia of credit into the system, make game selections that trigger software downloads, and receive entertainment in exchange for their inputs. Game software content providers provide game software for the system and may receive compensation for the content they provide based on licensing agreements with the gaming machine operators. Gaming machine operators select game software for distribution, distribute the game software on the gaming devices in the system 900, receive revenue for the use of their software and compensate the gaming machine operators. The gaming regulators 930 may provide rules and regulations that must be applied to the gaming system and may receive reports and other information confirming that rules are being obeyed.

In the following paragraphs, details of each component and some of the interactions between the components are described with respect to FIG. 7. The game software license host 901 may be a server connected to a number of remote gaming devices that provides licensing services to the remote gaming devices. For example, in other embodiments, the license host 901 may 1) receive token requests for tokens used to activate software executed on the remote gaming devices, 2) send tokens to the remote gaming devices, 3) track token usage and 4) grant and/or renew software licenses for software executed on the remote gaming devices. The token usage may be used in utility based licensing schemes, such as a pay-per-use scheme.

In another embodiment, a game usage-tracking host 915 may track the usage of game software on a plurality of devices in communication with the host. The game usage-tracking host 915 may be in communication with a plurality of game play hosts and gaming machines. From the game play hosts and gaming machines, the game usage tracking host 915 may receive updates of an amount that each game available for play on the devices has been played and on amount that has been wagered per game. This information may be stored in a database and used for billing according to methods described in a utility based licensing agreement.

The game software host 902 may provide game software downloads, such as downloads of game software or game firmware, to various devious in the game system 900. For example, when the software to generate the game is not available on the game play interface 911, the game software host 902 may download software to generate a selected game of chance played on the game play interface. Further, the game software host 902 may download new game content to a plurality of gaming machines via a request from a gaming machine operator.

In one embodiment, the game software host 902 may also be a game software configuration-tracking host 913. The function of the game software configuration-tracking host is to keep records of software configurations and/or hardware configurations for a plurality of devices in communication with the host (e.g., denominations, number of paylines, paytables, max/min bets). Details of a game software host and a game software configuration host that may be used with the present invention are described in U.S. Pat. No. 6,645,077, by Rowe, entitled, "Gaming Terminal Data Repository and Information System," filed Dec. 21, 2000, which is incorporated herein in its entirety and for all purposes.

A game play host device 903 may be a host server connected to a plurality of remote clients that generates games of chance that are displayed on a plurality of remote game play interfaces 911. For example, the game play host device 903 may be a server that provides central determination for a bingo game play played on a plurality of connected game play interfaces 911. As another example, the game play host device 903 may generate games of chance, such as slot games or video card games, for display on a remote client. A game player using the remote client may be able to select from a number of games that are provided on the client by the host device 903. The game play host device 903 may receive game software management services, such as receiving downloads of new game software, from the game software host 902 and may receive game software licensing services, such as the granting or renewing of software licenses for software executed on the device 903, from the game license host 901.

In particular embodiments, the game play interfaces or other gaming devices in the gaming system 900 may be portable devices, such as electronic tokens, cell phones, smart cards, tablet PC's and PDA's. The portable devices may support wireless communications and thus, may be referred to as wireless mobile devices. The network hardware architecture 916 may be enabled to support communications between wireless mobile devices and other gaming devices in gaming system. In one embodiment, the wireless mobile devices may be used to play games of chance.

The gaming system 900 may use a number of trusted information sources. Trusted information sources 904 may be devices, such as servers, that provide information used to authenticate/activate other pieces of information. CRC values used to authenticate software, license tokens used to allow the use of software or product activation codes used to activate to software are examples of trusted information that might be provided from a trusted information source 904. Trusted information sources may be a memory device, such as an EPROM, that includes trusted information used to authenticate other information. For example, a game play interface 911 may store a private encryption key in a trusted memory device that is used in a private key-public key encryption scheme to authenticate information from another gaming device.

When a trusted information source 904 is in communication with a remote device via a network, the remote device will employ a verification scheme to verify the identity of the trusted information source. For example, the trusted information source and the remote device may exchange information using public and private encryption keys to verify each other's identities. In another embodiment of the present invention, the remote device and the trusted information source may engage in methods using zero knowledge proofs to authenticate each of their respective identities. Details of zero knowledge proofs that may be used with the present invention are described in U.S. Patent Publication No. 2003/0203756, by Jackson, filed on Apr. 25, 2002 and entitled, "Authentication in a Secure Computerized Gaming System," which is incorporated herein in its entirety and for all purposes.

Gaming devices storing trusted information might utilize apparatus or methods to detect and prevent tampering. For instance, trusted information stored in a trusted memory device may be encrypted to prevent its misuse. In addition, the trusted memory device may be secured behind a locked door. Further, one or more sensors may be coupled to the memory device to detect tampering with the memory device and provide some record of the tampering. In yet another example, the memory device storing trusted information might be designed to detect tampering attempts and clear or erase itself when an attempt at tampering has been detected.

The gaming system 900 of the present invention may include devices 906 that provide authorization to download software from a first device to a second device and devices 907 that provide activation codes or information that allow downloaded software to be activated. The devices, 906 and 907, may be remote servers and may also be trusted information sources. One example of a method of providing product activation codes that may be used with the present invention is describes in previously incorporated U.S. Pat. No. 6,264,561.

A device 906 that monitors a plurality of gaming devices to determine adherence of the devices to gaming jurisdictional rules 908 may be included in the system 900. In one embodiment, a gaming jurisdictional rule server may scan software and the configurations of the software on a number of gaming devices in communication with the gaming rule server to determine whether the software on the gaming devices is valid for use in the gaming jurisdiction where the gaming device is located. For example, the gaming rule server may request a digital signature, such as CRC's, of particular software components and compare them with an approved digital signature value stored on the gaming jurisdictional rule server.

Further, the gaming jurisdictional rule server may scan the remote gaming device to determine whether the software is configured in a manner that is acceptable to the gaming jurisdiction where the gaming device is located. For example, a maximum bet limit may vary from jurisdiction to jurisdiction and the rule enforcement server may scan a gaming device to determine its current software configuration and its location and then compare the configuration on the gaming device with approved parameters for its location.

A gaming jurisdiction may include rules that describe how game software may be downloaded and licensed. The gaming jurisdictional rule server may scan download transaction records and licensing records on a gaming device to determine whether the download and licensing was carried out in a manner that is acceptable to the gaming jurisdiction in which the gaming device is located. In general, the game jurisdictional rule server may be utilized to confirm compliance to any gaming rules passed by a gaming jurisdiction when the information needed to determine rule compliance is remotely accessible to the server.

Game software, firmware or hardware residing a particular gaming device may also be used to check for compliance with local gaming jurisdictional rules. In one embodiment, when a gaming device is installed in a particular gaming jurisdiction, a software program including jurisdiction rule information may be downloaded to a secure memory location on a gaming machine or the jurisdiction rule information may be downloaded as data and utilized by a program on the gaming machine. The software program and/or jurisdiction rule information may used to check the gaming device software and software configurations for compliance with local gaming jurisdictional rules. In another embodiment, the software program for ensuring compliance and jurisdictional information may be installed in the gaming machine prior to its shipping, such as at the factory where the gaming machine is manufactured.

The gaming devices in game system 900 may utilize trusted software and/or trusted firmware. Trusted firmware/software is trusted in the sense that is used with the assumption that it has not been tampered with. For instance, trusted software/firmware may be used to authenticate other game software or processes executing on a gaming device. As an example, trusted encryption programs and authentication programs may be stored on an EPROM on the gaming machine or encoded into a specialized encryption chip. As another example, trusted game software, i.e., game software approved for use on gaming devices by a local gaming jurisdiction may be required on gaming devices on the gaming machine.

In the present invention, the devices may be connected by a network 916 with different types of hardware using different hardware architectures. Game software can be quite large and frequent downloads can place a significant burden on a network, which may slow information transfer speeds on the network. For game-on-demand services that require frequent downloads of game software in a network, efficient downloading is essential for the service to viable. Thus, in the present inventions, network efficient devices 910 may be used to actively monitor and maintain network efficiency. For instance, software locators may be used to locate nearby locations of game software for peer-to-peer transfers of game software. In another example, network traffic may be monitored and downloads may be actively rerouted to maintain network efficiency.

One or more devices in the present invention may provide game software and game licensing related auditing, billing and reconciliation reports to server 912. For example, a software licensing billing server may generate a bill for a gaming device operator based upon a usage of games over a time period on the gaming devices owned by the operator. In another example, a software auditing server may provide reports on game software downloads to various gaming devices in the gaming system 900 and current configurations of the game software on these gaming devices.

At particular time intervals, the software auditing server 912 may also request software configurations from a number of gaming devices in the gaming system. The server may then reconcile the software configuration on each gaming device. In one embodiment, the software auditing server 912 may store a record of software configurations on each gaming device at particular times and a record of software download transactions that have occurred on the device. By applying each of the recorded game software download transactions since a selected time to the software configuration recorded at the selected time, a software configuration is obtained. The software auditing server may compare the software configuration derived from applying these transactions on a gaming device with a current software configuration obtained from the gaming device. After the comparison, the software-auditing server may generate a reconciliation report that confirms that the download transaction records are consistent with the current software configuration on the device. The report may also identify any inconsistencies. In another embodiment, both the gaming device and the software auditing server may store a record of the download transactions that have occurred on the gaming device and the software auditing server may reconcile these records.

There are many possible interactions between the components described with respect to FIG. 7. Many of the interactions are coupled. For example, methods used for game licensing may affect methods used for game downloading and vice versa. For the purposes of explanation, details of a few possible interactions between the components of the system 900 relating to software licensing and software downloads have been described. The descriptions are selected to illustrate particular interactions in the game system 900. These descriptions are provided for the purposes of explanation only and are not intended to limit the scope of the present invention.

The many features and advantages of the present invention are apparent from the written description, and thus, it is intended by the appended claims to cover all such features and advantages of the invention. Further, since numerous modifications and changes will readily occur to those skilled.

What is claimed is:

1. A network server in a casino environment, the network server comprising:

a communications interface configured to communicate with a plurality of gaming machines via a network;

memory configured to store an aspect ratio specific data set including data associated with generating graphics information for a wager-based game for a plurality of aspect ratios, wherein the aspect ratio specific data set further includes a plurality of subsets of data, each subset comprising graphics content designed for display at a specific aspect ratio; and one or more processors operable to:

receive from a first gaming machine of the plurality of gaming machines, via the communications interface, an indication of a first aspect ratio associated with a first display at the first gaming machine, the first gaming machine configured to store base data for displaying graphical content associated with the wager-based game, select, based on the first aspect ratio, first aspect ratio specific data from the aspect ratio specific data set that can complement or replace at least a portion of the base data in order to display the graphical content associated with the wager-based game on the first display at the first aspect ratio, and transmit to the first gaming machine, via the communications interface, the first aspect ratio specific data for displaying the graphical content associated with the wager-based game on the first gaming machine, thereby allowing the base data and the first aspect ratio specific data to be used to display the graphical content associated with the wager-based game on the first display.

2. A network server as recited in claim 1, wherein the one or more processors are further operable to:

receive from a second gaming machine of the plurality of gaming machines, via the communications interface, an indication of a second aspect ratio associated with a second video display at the second gaming machine, the second gaming machine storing base data for displaying content associated with the wager-based game;

select, based on the second aspect ratio, second aspect ratio specific data from the aspect ratio specific data set that can complement or replace at least a portion of the base data in order to display the content on the second display at the second aspect ratio; and transmit to the second gaming machine, via the communications interface, the second aspect ratio specific data for displaying the content on the second gaming machine, thereby allowing the base data and the second aspect ratio specific data to be used to display the content on the second display.

3. A network server as recited in claim 1, wherein the first aspect ratio specific data includes graphical content modeled in accordance with a three-dimensional (3D) model designed in accordance with the first aspect ratio.

4. A network server as recited in claim 1, wherein the base data includes a set of base or model objects for displaying at a plurality of aspect ratios.

5. A network server as recited in claim 4, wherein the first aspect ratio specific data can be used to modify, at the first gaming machine, one or more of the set of base objects in order to display them on the first display in accordance with one or more design criteria for displaying graphical content associated with the wager-based game at the first aspect ratio.

6. A network server as recited in claim 5, wherein modifying the one or more base objects comprises one or more of the following: scaling a base object, moving a base object, changing a relationship between two or more base objects, and introducing a new relationship between two base objects or modified base objects.

7. A network server as recited in claim 6, wherein the first aspect ratio specific data includes one or more other objects not included in the base objects, thereby allowing the one or more other objects to be added to the base objects when the graphical content associated with the wager-based game is displayed on the first display at the first aspect ratio.

8. A network server as recited in claim 1, wherein the one or more processors are further operable to determine whether the base data are sufficient to display graphical content associated with the wager-based game on the first display at the first aspect ratio.

9. A network server as recited in claim 8, wherein determining whether the base data are sufficient to display the graphical content associated with the wagerbased game on the first display at the first aspect ratio comprises:

determining whether display of the base data meets one or more criteria for displaying the graphical content associated with the wager-based game at the first aspect ratio, the criteria including a regulatory requirement.

10. A gaming machine configured to present a wager-based game in a casino environment, the gaming machine comprising:

a communications interface configured to communicate with a network server via a network;

a first display configured to display content associated with the wager-based game;

memory configured to store base data for displaying graphical content associated with the wager-based game; and one or more processors operable to:

transmit to the network server, via the communications interface, an indication of a first aspect ratio associated with the first display at the gaming machine, and receive from the network server, via the communications interface, first aspect ratio specific data for displaying the graphical content associated with the wager-based game on the gaming machine that can complement or replace at least a portion of the base data in order to display the graphical content associated with the wager-based game on the first display at the first aspect ratio, the first aspect ratio specific data selected from an aspect ratio specific data set including data associated with generating graphics information for the wager-based game for a plurality of aspect ratios, wherein the aspect ratio specific data set further includes a plurality of subsets of data, each subset comprising graphics content designed for display at a specific aspect ratio, thereby allowing the base data and the first aspect ratio specific data to be used to display the graphical content associated with the wager-based game on the first display.

11. A gaming machine as recited in claim 10, wherein the base data includes a set of base or mode objects for displaying at a plurality of aspect ratios.

12. A gaming machine as recited in claim 11, wherein the one or more processors are further operable to use the first aspect ratio specific data to modify one or more of the set of base objects in order to display them on the first display in accordance with one or more design criteria for displaying graphical content associated with the wager-based game at the first aspect ratio.

13. A gaming machine as recited in claim 12, wherein modifying the one or more base objects comprises one or more of the following: scaling a base object, moving a base object, changing a relationship between two or more base objects, and introducing a new relationship between two base objects or modified base objects.

14. A gaming machine as recited in claim 13, wherein the first aspect ratio specific data includes one or more other objects not included in the base objects, thereby allowing the one or more other objects to be added to the base objects when the graphical content associated with the wager-based game is displayed on the first display at the first aspect ratio.

15. A gaming machine as recited in claim 10, wherein the one or more processors are further operable to determine whether the base data are sufficient to display graphical content associated with the wager-based game on the first display at the first aspect ratio.

16. A gaming machine as recited in claim 15, wherein determining whether the base data are sufficient to display the graphical content associated with the wagerbased game on the first display at the first aspect ratio comprises:

determining whether display of the base data meets one or more criteria for displaying the graphical content associated with the wager-based game on the first display at the first aspect ratio, the criteria including a regulatory requirement.

17. A method for adapting graphical content at a gaming machine for display at a first aspect ratio, the method comprising:

transmitting to a network server from a gaming machine, via a communications interface at the gaming machine, an indication of a first aspect ratio associated with a first display at the gaming machine;

receiving at the gaming machine from the network server, via the communications interface, first aspect ratio specific data for displaying the graphical content associated with a wager-based game on the gaming machine, the first aspect ratio specific data selected from an aspect ratio specific data set including data associated with generating graphics information for the wager-based game for a plurality of specific aspect ratios, wherein the aspect ratio specific data set further includes a plurality of subsets of data, each subset comprising graphics content designed for display at a specific aspect ratio; and displaying the graphical content associated with the wager-based game on the first display at the first aspect ratio by using the first aspect ratio specific data to complement or replace at least a portion of base data stored on the gaming machine, the base data including data to display graphical content associated with the wager-based game.

18. A method as recited in claim 17, wherein the base data includes a set of base or model objects for displaying at a plurality of aspect ratios.

19. A method as recited in claim 18, further comprising using the first aspect ratio specific data to modify, at the gaming machine, one or more of the set of base objects in order to display them on the first display in accordance with one or more design criteria for displaying graphical content associated with the wager-based game on the first display at the first aspect ratio.

20. A method as recited in claim 19, wherein modifying the one or more base objects comprises one or more of the following: scaling a base object, moving a base object, changing a relationship between two or more base objects, and introducing a new relationship between two base objects or modified base objects.

21. A method as recited in claim 20, wherein the first aspect ratio specific data includes one or more other objects not included in the base objects, thereby allowing the one or more other objects to be added to the base objects when the graphical content associated with the wager-based game is displayed on the first display at the first aspect ratio.

22. A method as recited in claim 17, further comprising determining whether the base data are sufficient to display graphical content associated with the wager-based game on the first display at the first aspect ratio.

23. A method as recited in claim 22, wherein determining whether the base data are sufficient to display the graphical content associated with the wager-based game on the first display at the first aspect ratio comprises:

determining whether display of the base data meets one or more criteria for displaying the graphical content associated with the wager-based game on the first display at the first aspect ratio, the criteria including a regulatory requirement.

* * * * *